US012718040B2

(12) United States Patent
Seitz et al.

(10) Patent No.: US 12,718,040 B2
(45) Date of Patent: Aug. 25, 2026

(54) DE-TUNED MULTIPLE RFID ANTENNA ARRANGEMENT FOR GAMING

(71) Applicant: FORTISS, LLC, Los Angeles, CA (US)

(72) Inventors: Tyler J. Seitz, Portland, OR (US); Forrest S. Seitz, Beaverton, OR (US); Joshua K. Hoyt, Portland, OR (US)

(73) Assignee: FORTISS, LLC, Los Angeles, CA (US)

( * ) Notice: Subject to any disclaimer, the term of this patent is extended or adjusted under 35 U.S.C. 154(b) by 0 days.

(21) Appl. No.: 19/273,602

(22) Filed: Jul. 18, 2025

(65) Prior Publication Data

US 2025/0342328 A1 Nov. 6, 2025

Related U.S. Application Data

(63) Continuation of application No. 18/758,552, filed on Jun. 28, 2024, now Pat. No. 12,387,067, which is a continuation of application No. 18/181,330, filed on Mar. 9, 2023, now Pat. No. 12,056,564, which is a continuation of application No. 17/587,293, filed on Jan. 28, 2022, now Pat. No. 11,630,964.

(60) Provisional application No. 63/283,086, filed on Nov. 24, 2021.

(51) Int. Cl.
*G06K 7/10* (2006.01)
*G07F 17/32* (2006.01)

(52) U.S. Cl.
CPC ..... *G06K 7/10366* (2013.01); *G06K 7/10316* (2013.01); *G07F 17/322* (2013.01); *G07F 17/3248* (2013.01)

(58) Field of Classification Search
CPC .......... G06K 7/10366; G06K 7/10316; G06K 7/10356; G07F 17/322; G07F 17/3248; G07F 17/3239
See application file for complete search history.

(56) References Cited

U.S. PATENT DOCUMENTS

2006/0287078 A1 12/2006 Smolucha et al.
2011/0241835 A1 10/2011 Amtmann et al.

FOREIGN PATENT DOCUMENTS

WO WO-2011060486 A1 * 5/2011 ......... G07F 17/3234

OTHER PUBLICATIONS

Related European Application No. 22899493.5; filed Nov. 21, 2022; Extended European Search Report issued Sep. 8, 2025; 9 pages.
Intellectual Property Office (ROC) Taiwan, Office Action issued in TW Application No. 113118098, dated Jan. 8, 2026, 14 pgs.

* cited by examiner

*Primary Examiner* — Jamara A Franklin
(74) *Attorney, Agent, or Firm* — Fountainhead Law Group, PC

(57) ABSTRACT

A gaming table contains a number of antennas that are de-tuned from the resonant frequency of a single RFID tag. This increases the power required to read the single tag but matches the resonant frequency for reading a stack of RFID tags. The gaming table may further include an instrumented dolly that manages the game states.

20 Claims, 13 Drawing Sheets

RFID System 200

300

400

RFID System 700

800

900

RFID System 1100

DE-TUNED MULTIPLE RFID ANTENNA ARRANGEMENT FOR GAMING

CROSS REFERENCE TO RELATED APPLICATIONS

The present application is a continuation of U.S. patent application Ser. No. 18/758,552 for "De-Tuned Multiple RFID Antenna Arrangement for Gaming" filed Jun. 28, 2024, which is a continuation of U.S. patent application Ser. No. 18/181,330 for "De-Tuned Multiple RFID Antenna Arrangement for Gaming" filed Mar. 9, 2023, which is a continuation of U.S. patent application Ser. No. 17/587,293 for "De-Tuned Multiple RFID Antenna Arrangement for Gaming" filed Jan. 28, 2022, which claims the benefit of U.S. Provisional App. No. 63/283,086 for "De-Tuned Multiple RFID Antenna Arrangement for Gaming" filed Nov. 24, 2021, all of which are incorporated herein by reference.

BACKGROUND

The present invention relates to gaming, and in particular, to a radio frequency identification (RFID) system with an antenna arrangement for detecting the locations of RFID tags on a gaming table.

Unless otherwise indicated herein, the approaches described in this section are not prior art to the claims in this application and are not admitted to be prior art by inclusion in this section.

Tracking the location of gaming tokens in real-time on a gaming table has the potential to revolutionize the gaming industry by providing cash management and improved security. Tying this data to specific players allows casinos to create accurate player profiles while simultaneously alleviating the pit boss of mundane tasks that take years of training to hone.

Traditional RFID systems have tried to address the gaming market with limited success. In a typical RFID system, the excitation antenna defines a "working volume" within which the energy projected by the antenna is sufficient to power the RFID tag. This "working volume" is generally poorly defined with the only option to increase/decrease power to adjust the read range. But doing so extends the read range in ALL directions, introducing cross-talk errors when multiple antennas are in close proximity. Existing products on the market suffer from multiple shortcomings. First, they are limited to discrete betting spots. Second, they are limited in the chip stack heights they can read. Third, they have very poor discrimination between adjacent betting spots. Fourth, they have higher than acceptable read errors. Fifth, they have slow read rates that miss important events (e.g., placement and removal of chips, etc.).

These shortcomings limit the available technology to games where the betting spots are widely separated (e.g., a single "pot"), to detecting initial bets only (not capturing transient events such as payouts), and to identifying counterfeit tokens only prior to their use on a table (not during gameplay).

U.S. Application Pub. No. 2013/0233923 discusses a ferrite core technology. The ferrite core technology overcomes many of the above-noted shortcomings, but does not address the need to track multiple separate bets placed by different bettors on a single larger betting spot (such as when "back bettors" share a betting spot with seated bettors on traditional Baccarat layouts). Also needed is the ability to discriminate the location of very closely spaced bets (such as can be found on a roulette table).

U.S. Application Pub. No. 2017/0228630 discusses a solution involving two intersecting antenna arrays. One array of horizontal antennas provides one coordinate, and a second array of vertical antennas provides a second coordinate. Signal strength information comparing adjacent antennas may then be used to interpolate a higher fidelity set of coordinates.

Although the approach of U.S. Application Pub. No. 2017/0228630 does work, it suffers from the simple fact that reading RFID tags takes time—and reading tags multiple times for purposes of interpolation multiplies the required time such that capturing an accurate "snapshot" of transient events with large numbers of tags may not be practical in certain gaming environments.

The typical RFID system addresses the question, "Who's there?" The response is a series of unique item identifiers (e.g., serial numbers). As discussed above, the ferrite core technology discussed in U.S. Application Pub. No. 2013/0233923 is directed to addressing the additional question "Where are you?" as a way to track individual bets.

U.S. Application Pub. No. 2016/0217645 discusses using a network analyzer device prior to an RFID read, thereby being able to direct the RFID reader to only those antennas with tags present. This describes a serial approach that eliminates the "overhead" of looking for tags using an RFID reader where none are present, as using the network analyzer device takes less time than using the RFID reader.

Both U.S. Application Pub. No. 2013/0233923 and U.S. Application Pub. No. 2016/0217645 involve the placement of bets in specific areas (the betting spots). RFID tags not placed in one of the defined areas will not be read correctly. Neither of these disclosures addresses the need to detect bets placed anywhere on a larger bounded area. The additional disclosure of U.S. Application Pub. No. 2017/0228630 does address placing multiple bets within a larger bounded area. However, the system disclosed therein involved multiple RFID reads to define the coordinates of each bet, which is a time-consuming process.

All three of U.S. Application Pub. No. 2013/0233923, U.S. Application Pub. No. 2016/0217645 and U.S. Application Pub. No. 2017/0228630 describe systems to identify and locate RFID tags by using signal strength information as measured by the RFID reader to determine proximity to a specific antenna. U.S. Application Pub. No. 2013/0233923 describes a system that increases the signal strength at the proper antenna, which further improves accuracy.

U.S. Application Pub. No. 2021/0011107 discusses various antenna arrangements for gaming.

SUMMARY

One issue with existing systems is that specific gaming tables have specific betting areas of varying sizes, which makes reading the RFID tags in each area a challenge. There is a need for antenna arrangements that work well with specific gaming tables, such as a roulette table.

Given the above, embodiments are directed toward improving the detection of RFID tags on a roulette table.

According to an embodiment, a system determines locations of objects in a gaming environment. The system includes a number of radio-frequency identification (RFID) antennas arranged at a plurality of locations on a gaming table, and an RFID reader coupled to the RFID antennas. An antenna is impedance matched with a stack of RFID tags with a first impedance matching value, where the first impedance matching value differs from a second impedance matching value for impedance matching the antenna with a single RFID tag. The first impedance matching value results in a less efficient impedance matching than the second impedance matching value between the single RFID tag and the antenna.

The system may further include one or more reactive tuning components that couple the antenna to the RFID reader, where the one or more reactive tuning components are selected from capacitors and inductors. The antenna is impedance matched to the stack of RFID tags by adjusting a reactance of the one or more reactive tuning components.

Each of the antennas may be impedance matched with the stack of RFID tags according to a corresponding type for each of the plurality of antennas, where the type includes a size, a shape and a configuration. The types of antennas may include a spot antenna type, a line antenna type, and a cross antenna type.

According to an embodiment, a method determines locations of objects in a gaming environment. The method includes providing a number of radio-frequency identification (RFID) antennas arranged at a number of locations on a gaming table. The method further includes providing an RFID reader coupled to the plurality of RFID antennas. An antenna is impedance matched with a stack of RFID tags with a first impedance matching value, where the first impedance matching value differs from a second impedance matching value for impedance matching the antenna with a single RFID tag. The first impedance matching value results in a less efficient impedance matching than the second impedance matching value between the single RFID tag and the antenna.

The following detailed description and accompanying drawings provide a further understanding of the nature and advantages of embodiments of the present invention.

DETAILED DESCRIPTION

Figure 1:
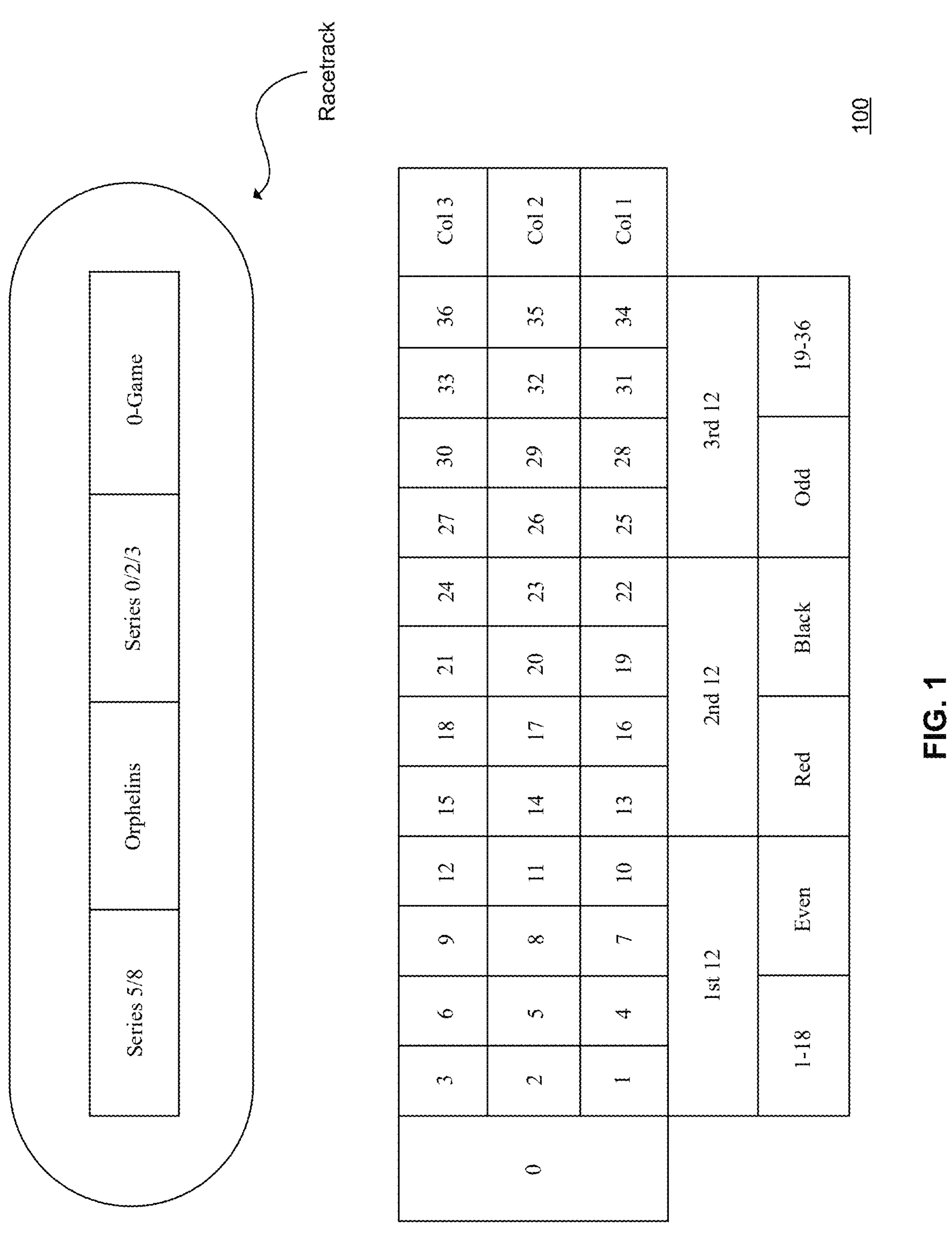
FIG. 1 is a top view of a roulette table 100.

Described herein are techniques for location determination of RFID tags. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

In this document, the terms "RFID tag", "RFID gaming tag", "RFID chip", "RFID gaming chip", "gaming chip", and "gaming token" are used. Such terms are to be read as being broadly synonymous. (More precisely, an "RFID chip" may be used to refer to the integrated circuit components of the "RFID tag", which also includes additional components such as an antenna, a rigid housing, etc. However, this document is mostly concerned with the broad usage for these terms.) The RFID tag responds to a radio frequency signal from the RFID reader, generally with its serial number or other identifier, enabling the RFID reader to obtain an inventory of the RFID tags in the vicinity. In a gaming context, the RFID gaming tags may be placed on, removed from, or moved around on a gaming table as bets and payouts, according to various game rules. The RFID gaming tags may be marked with a value identifier (e.g., $1).

Roulette Overview

Roulette is a table game that includes a spinning wheel. Players may place bets at various locations on the gaming table that are associated with numbers on the wheel, and the bets are paid out based on where a ball lands on the wheel. A typical roulette wheel has 36 numbered spots (labeled 1-36) and 1, 2 or 3 "zero" spots (typically labeled 0, 00 and 000; for purposes of this document, assume 1 "zero" spot). The numbered spots are also colored, with the "zero" spot colored green, half the spots 1-36 colored red, and the other half colored black. The numbers on the wheel are typically ordered in a defined non-sequential way.

FIG. 1 is a top view of a roulette table 100. The wheel is omitted. The roulette table 100 has a number of betting areas in which gaming tokens may be placed, corresponding to various bets. These betting areas include a 3×12 grid of areas labeled 1-36 (corresponding to the 36 numbered spots on the wheel), an area labeled 0 (corresponding to the "zero" spot), 3 areas for betting on groups of 12 numbers (1st 12 [1-12], 2nd 12 [13-24], 3rd 12 [25-36]), 6 areas for betting on other number groups (1-18, 19-36, even, odd, red, black), 3 areas for betting a specific column of 12 numbers (column 1 that includes the numbered spot for 1, column 2 that includes the spot for 2, column 3 that includes the spot for 3), and a "racetrack" that includes each of the numbers on the wheel and 4 areas for other bets (series 5/8, orphelins, series 0/2/3, 0-game). The racetrack is an oval-shaped collection of 37 areas that correspond to the 37 numbers on the roulette wheel arranged as they are on the wheel; this allows for betting on adjacent numbers as they appear on the wheel, referred to as "neighbors bets". (Note that the figure omits showing the specific number arrangement.) In addition to being able to place bets on adjacent numbers, there are 4 areas of the racetrack that allow the bettor to choose specific groups of numbers. The series 5/8 bet, also referred to as tiers du cylinder, corresponds to the following 12 numbers: 27, 13, 36, 11, 30, 8, 23, 10, 5, 24, 16, 33. The orphelins bet corresponds to the following 8 numbers: 17, 34, 6, 1, 20, 14, 31, 9. The series 0/2/3 bet, also referred to as voisins du zero, corresponds to the following 10 numbers: 19, 4, 21, 2, 25, 22, 18, 29, 7, 28. The 0-game bet corresponds to the following 7 numbers: 12, 35, 3, 28, 0, 32, 15. The types of bets, and the corresponding betting spots on the roulette table, may be varied from those shown on the roulette table 100 as desired.

Bets can be made in various ways: a single number (by placing a gaming token within a betting area, e.g. the area for the number 12), a pair of numbers (placed on the line between two numbers, e.g. 11, 14), 3 numbers in a specific row (placed on the line at the edge of the row, e.g. 13, 14, 15), 4 numbers that share an intersection (placed at the intersection, e.g. 5, 6, 8, 9), 6 numbers in two adjacent rows (placed on the line at the edge of the two rows at the intersection, e.g. 22, 23, 24, 25, 26, 27), 12 numbers in a column (placed in the column area), or within one or more of the other betting areas (e.g. the groups of 12, the groups of 18, odd, even, red, black, the racetrack areas, etc.).

Each of these bets has different odds and therefore different payouts, which can range from 35:1 to 2:1. The current state of the art requires the croupier to identify all winning combinations and correctly sum up the proper payout for each player. For example, a single player may get paid out with a formula such as: 2*35+3*17+5*11+10*2=196. It is not hard to imagine errors occurring. With a house advantage of 3%, it does not take many errors to have a negative impact on casino profitability.

Roulette differs from other casino games in that it uses dedicated "color" chips—one color for each player—instead of the "value" chips used in other casino games (e.g., $1 chips, $25 chips, etc.). When a player wants to bet at a roulette table, they must first exchange their value chips for color chips. When doing so, each player must declare the corresponding value of their color chips. All chips of one color have the same value, and other colors may have different values. For example, Player 1 may select blue chips and declare their value to be $1 each, Player 2 may select red chips declared at $5 each, and Player 3 may select white chips and declare their value to be $100 each. In many casinos, this is done verbally and it is up to the croupier to manage these exchanges.

Casinos have a long history of rewarding their best customers. These rewards are referred to as "comps" and can take the form of meals, lodging, extra chips, drinks, etc. The value of the comps are tied to the volume of play, with longer play and higher bets inevitably resulting in more revenue for the house. Thus it is important to accurately track the betting volume and bet type of each player. (In this context, the bet type may be one of a number bet, a row bet, a column bet, an odd/even bet, etc. and is identified and tracked using RFID tags because each bet type has different odds.) To do this accurately, it is important to tie each bet to its corresponding bettor. In roulette, the use of unique color chips for each player makes this feasible. When a player "buys in" to a roulette table, they exchange cash or value chips for color chips. Having the player also use an RFID-enabled loyalty card (or equivalent) to insure proper comps are received is beneficial to all parties. Furthermore, tracking the player's win/loss ratio throughout their tenure at the roulette table will result in a more accurate picture of player behavior.

Each game of roulette involves spinning the roulette wheel, and the winning number is determined by where the ball lands within the spinning wheel. At this point, the croupier places a "dolly" on the corresponding number on the table top. The dolly remains in place until all losing bets are removed and all winning bets are paid out. Due to the complexity of the number and types of bets, the dolly aids in resolving mis-understandings between house and player. In addition, tables are known to become "unbalanced" (uneven statistical outcomes). For example, the table may become unbalanced due to worn bearings on the wheel, mounting the wheel at a slight incline, physical wear on the wheel such as worn edges on the bumpers separating each of the pockets where the ball lands, etc. Detection can be achieved by studying the statistical variability of the ball landing on a specific spot (as compared to the desired case where all spots have an equal probability).

A game of roulette may be defined using three states: Open Betting, Play, and Payout. In the Open Betting state, the wheel is spun, the ball is released, and players may freely place and remove bets. The Open Betting state is initiated by the new game event and ends with the bets locked event, while the ball is still in motion in the wheel. The Open Betting state is followed by the Play state. The Play state is initiated by the bets locked event and ends with the winning number event. In the Play state, the ball is still in motion but players may not place or remove bets; the winning number event occurs when the ball stops in a numbered pocket on the wheel. The Play state is followed by the Payout state, which is initiated by the winning number event and ends with the end of game event. In the Payout state, the croupier removes losing bets and pays out winning bets. The system then transitions from the current (completed) game to the subsequent (next) game and a new set of Open Betting, Play and Payout states.

As discussed in more detail in the Payout Calculator section, the system may monitor a number of potential events, including tracking individual bets on each betting spot, identifying late or changed bets (referred to as "capped" bets), tracking the removal of both losing and winning bets, and tracking of "let it ride" bets for the subsequent game.

Prior to the bets locked event, players are free to place new bets or change existing bets. Once the bets locked milestone is reached, placing new bets is not allowed and the system may detect any new bets or changes in existing bets and generate an alert. The bets locked event can be automated (e.g. sensors in the wheel, voice command from the croupier, etc.) or determined manually (e.g. pressing a switch). Similarly, the winning number event can be automated (e.g. sensors in the wheel, voice command) or determined manually (e.g. placement of an RFID-enabled dolly on the antenna for the winning number; see the Instrumented Dolly section below). Similarly, the end of game event can be automated (e.g. removal of the RFID-enabled dolly from the antenna for the winning number; see the Instrumented Dolly section below) or determined manually (e.g. a "change of game state" switch).

RFID Tags and Roulette

Previous disclosures, including U.S. Application Pub. Nos. 2013/0233923 and 2017/0228630, discuss the detection of RFID-enabled gaming tokens by antennas on a gaming table. However, roulette presents some specific challenges that cannot be addressed solely by these earlier disclosures. First, the spacing of adjacent betting spots on roulette is significantly tighter and is constrained by defined table geometries. Second, player behavior results is significantly taller stacks of chips placed on one or more spots, necessitating increased sensitivity and specificity when assigning chips to specific betting spots. Third, there is a wide variety of shapes and sizes for the betting spots.

In general, a RFID tag is tuned to a specific resonant frequency, e.g. 13.56 MHz. The traditional solution is to configure the RFID tag with a high, narrow Q at the resonant frequency, in order to reduce the amount of power that must be output by the RFID reader in order to generate a response by the RFID tag. In contrast to this traditional solution, U.S. Application Pub. No. 2013/0233923 describes using a ferrite core and components that tunes the RFID tag to a frequency higher than 13.56 MHz. Any coupling by adjacent RFID tags shifts their resonant frequency lower and thus closer to 13.56 MHz, increasing the power received from the RFID reader. In summary, U.S. Application Pub. No. 2013/0233923 describes tuning the Q of the RFID tag.

In response to these challenges, the following sections describe a number of features that improve the detection of RFID tags on a roulette table. First, the Antenna Tuning section and the Dynamic Antenna Tuning section (Sections 1 and 2 below) describe tuning the excitation tag of the RFID reader to further increase the read range as defined by the height of a stack of RFID tags placed on an antenna. Note that these sections differ from the tuning described in U.S. Application Pub. No. 2013/0233923 in that they are directed toward tuning the antenna in the RFID reader, not tuning the antenna in the RFID tags.

Second, the Fast Scanning of Antennas section (Section 3 below) describes using the antenna reflection coefficient S11 for antennas with larger areas than as described in previous disclosures such as U.S. Application Pub. No. 2016/0217645.

Third, the Instrumented Dolly section (Section 4 below) describes features for improving the transitions between game states in roulette.

As a result, the features described herein enable a number of improvements in data collection, monitoring, and process control to support casino operations for roulette. First, they enable correctly detecting the number and color of each chip on a betting spot, correctly distinguishing the bets on one spot from any bets on adjacent spots, and correctly tracking the total bets placed for each spin of the wheel. Second, they enable clearly defining game state in order to adjust game logic using an RFID-enabled dolly, correctly identifying the winning number, and correctly calculating the payout for each bet and displaying this information in an easy to use format. Third, they provide a set of alarms tailored to detecting illegal chip movements in roulette. Fourth, the assist in unambiguously assigning the value of each chip color. Fifth, they enable tracking the betting habits of individual players, tracking dealer metrics (e.g. speed of play, number and type of errors, etc.), tracking game outcomes over time to determine if the wheel is "true", and automatically Open/Close a table (e.g. during personnel shift changes).

1. Antenna Tuning

Figure 2:
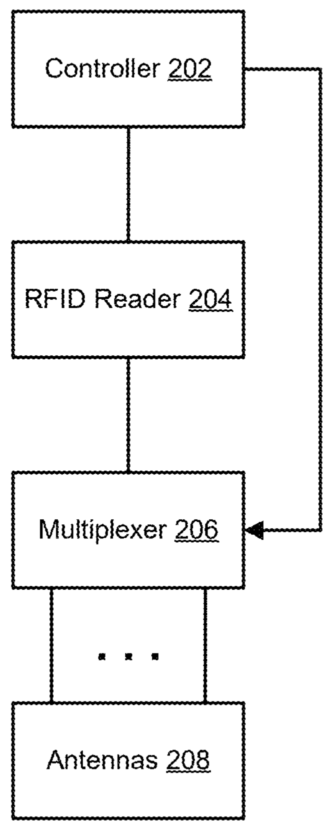
FIG. 2 is a block diagram of an RFID system 200.

FIG. 2 is a block diagram of an RFID system 200. The RFID system 200 may generally be implemented in a gaming table, specifically a roulette table, that includes features such as betting spots similar to those shown in FIG. 1, a wheel, etc. The RFID system 200 includes a controller 202, an RFID reader 204, a multiplexers 206, and a number of antennas 208.

The controller 202 generally controls the operation of the RFID system 200. The controller 202 controls the RFID reader 204 to generate a read command and receives the RFID tag identifiers from the RFID reader 204 in response to the read command. The controller 202 controls the multiplexer 206 to connect to a selected one of the antennas 208. The controller 202 includes a tag database that associates RFID tag identifiers with chip values. The controller 202 may also implement other functionality, such as calculating and displaying chip values corresponding to the detected RFID tag identifiers, tracking game states, generating alerts, etc. as described throughout this document. The controller 202 may be implemented by a computer or other device that includes a processor, such as a personal computer.

The RFID reader 204 generates a read command by outputting a carrier wave at a given frequency; any RFID tags that receive the power respond with their tag identifier by modulating the carrier wave. The RFID tags may respond according to an anti-collision process. The RFID tags may also be responsive to an acknowledgement command from the RFID reader 204, so that a given tag stops responding until the next read cycle.

The multiplexer 206 connects the RFID reader 204 to a selected one of the antennas 208. The multiplexer 206 may be implemented with radio frequency switches. In response to a command from the controller 202, the multiplexer 206 connects a selected antenna 208 to the RFID reader 204. This enables multiple antennas to be associated with one RFID reader. The RFID reader 204 then selectively connects to the antennas 208 in a time share manner.

The antennas 208 are generally associated with areas on the roulette table. For example, a given antenna 208 may be associated with the betting spot for betting on the number "1". In addition, roulette bets may be placed on the lines and intersections between multiple numbered spots, and antennas may be associated with these lines and intersections. As these betting spots, lines and intersections have different sizes and shapes, the sizes and shapes of the antennas 208 may vary as well, as discussed in subsequent paragraphs.

As a specific example for a roulette table, the RFID system 200 includes 200 or more antennas 208 on multiple printed circuit boards feeding into a single RFID reader 204. Embodiments with multiple readers and multiplexers (e.g. one reader and one multiplexer per circuit board) may also be implemented, with the controller 202 coordinating the multiple RFID readers and multiplexers. With the RFID reader 204 taking an average of 5 msec to perform a read, this arrangement results in the RFID reader 204 taking 1 second to read all 200 of its associated set of the antennas 208 if no tags are present; reading a tag takes approximately 7 msec, so if 50 tags are present, the total read time is 1.35 seconds (5 msec*200+7 msec*50). The number of RFID readers 204, the number of multiplexers 206, and the number of antennas 208 may be adjusted as desired.

As discussed above, roulette has unique requirements that strain the sensitivity and specificity of reading closely-spaced RFID tags. Using RFID tags with a ferrite core (e.g. as described in U.S. Application Pub. No. 2013/0233923), the RFID tags are very tightly coupled and multiple tags can detune from the proper antenna match.

In contrast to what would be expected in a conventional RFID system (e.g., in which the antenna is tuned to the resonant frequency of the RFID tags), the RFID system 200 is somewhat counter-intuitive in that the antennas 208 are not tuned to the typical resonant frequency of the RFID tags. Instead, the antennas 208 are de-tuned in a manner that is tailored such that the resulting frequency shift that occurs when multiple tags are present moves in the direction of optimal tuning, while still retaining the requisite sensitivity when only a small number of RFID tags are present in the radio frequency excitation field. In this manner, any diminution of signal strength from chips added to the top of a stack on a betting spot (due to distance from the excitation antenna) is offset by increased sensitivity as the resonance shifts closer to the ideal.

Careful measurement of the coupling as a function of the number of chips in the stack allows configuring each of the antennas 208 with a tuning to maximize the sensitivity of the antenna (and thereby maximizing the height of the stack of chips that can be read at a given power level).

To get the highest field strength it is desirable to have a high Q. The tradeoff is that a high Q circuit is easily detuned—and placement of multiple chips in the excitation field will cause this de-tuning. Thus with high Q antennas, it is best to tune for a high stack height. Tuning to the tall stack height (rather than for a single chip) can result in 7 dB signal improvement at the top of the stack (where the excitation field is weakest). As a result, system performance limits are set by the chip on the top of the stack.

Figure 3:
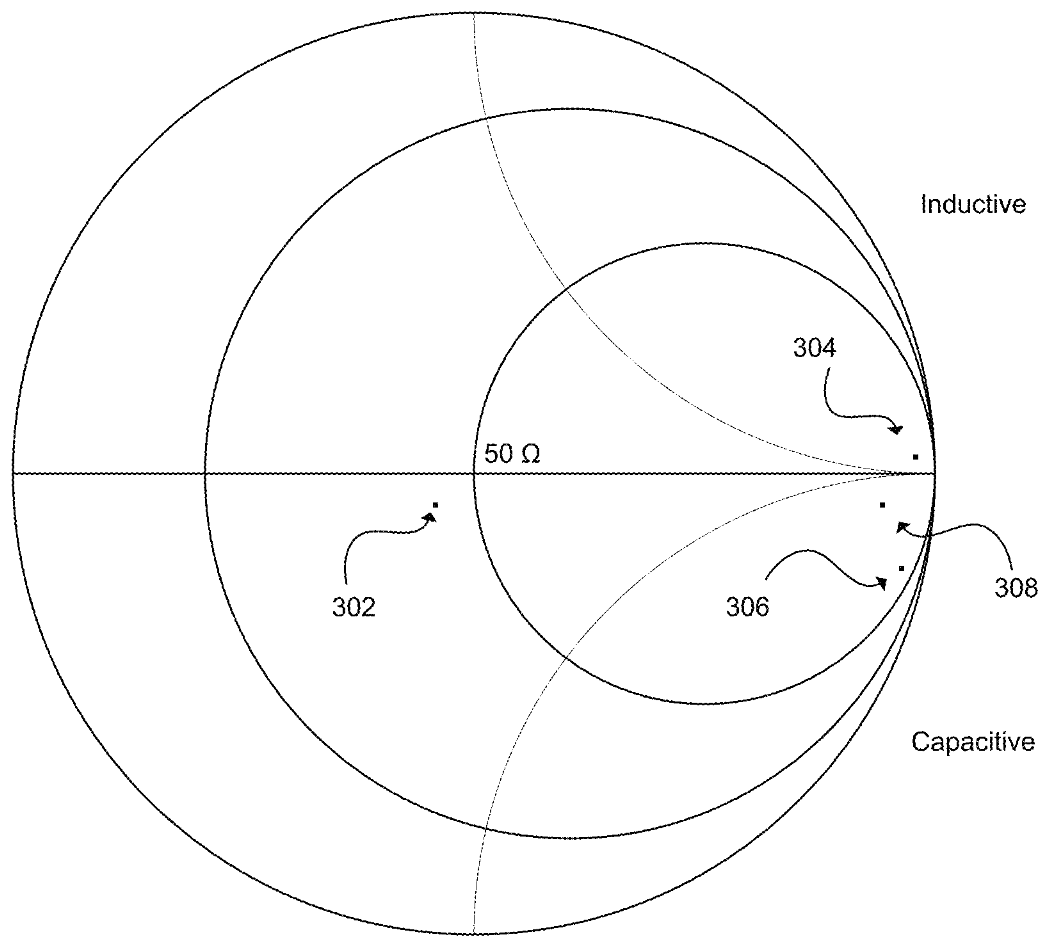
FIG. 3 is a graph 300 of a Smith chart for an antenna tuned for a single RFID tag.

FIG. 3 is a graph 300 of a Smith chart for an antenna tuned for a single RFID tag. The scaling is omitted, and the antenna is tuned for 50 Ohms. The graph 300 includes 4 data points corresponding to the reflection coefficient S11 measured for various numbers of RFID tags arranged in a stack on the antenna. Point 302 corresponds to 1 tag, point 304 corresponds to 5 tags, point 306 corresponds to 10 tags, and point 308 corresponds to 20 tags. Because the antenna is tuned for 1 tag, point 302 lies near the center of the chart, indicating a close impedance match to 50 Ohms. Points 304, 306 and 308 are all the way at the right edge, indicating a large impedance mis-match, which occurs when only a few more tags are added to the stack. As a result of the impedance mis-match, a much higher power level is required to perform a read. Thus, tuning the antenna for a single tag severely limits the sensitivity (e.g. ability to read larger numbers of tags) at a given power level.

Figure 4:
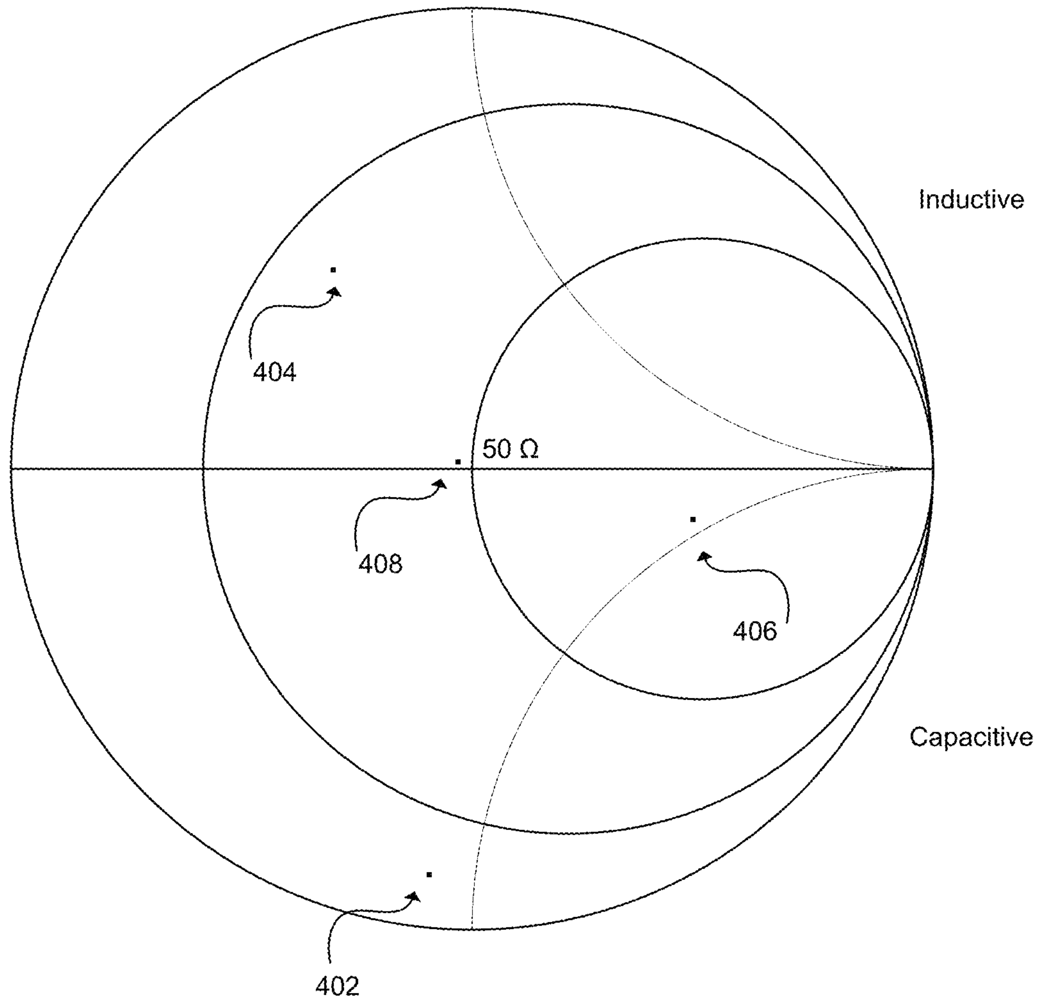
FIG. 4 is a graph 400 of a Smith chart for an antenna tuned for a stack of 20 RFID tags.

FIG. 4 is a graph 400 of a Smith chart for an antenna tuned for a stack of 20 RFID tags. The scaling is omitted, and the antenna is tuned for 50 Ohms. The graph 400 includes 4 data points corresponding to the reflection coefficient S11 measured for various numbers of RFID tags arranged in a stack on the antenna. Point 402 corresponds to 1 tag, point 404 corresponds to 5 tags, point 406 corresponds to 10 tags, and point 408 corresponds to 20 tags. Because the antenna is tuned for 20 tags, point 408 lies in the center of the chart, indicating a close impedance match. Points 402, 404 and 406 are a bit offset from the center, but not as far offset as in FIG. 3, indicating less of an impedance mis-match than in FIG. 3. It is important to note that while the impedance match is degraded when fewer chips are present, they require less power than the mis-match of FIG. 3 and therefore can still be read in spite of the mismatch.

TABLE 1 shows a comparison of tuning between 1 tag and 30 tags for a 4-turn loop antenna with a diameter of 30 mm.

TABLE 1

| | | | When reading 1 tag | | When reading 30 tags | |
|---|---|---|---|---|---|---|
| | Reactance | | | Power | | Power |
| Tuning | Series | Shunt | Impedance | required | Impedance | required |
| 1 tag | 162 pF | 936 pF | 52 + j3 Ω | 0.5 mW | 5 − j9 Ω | 603 mW |
| 30 tags | 194 pF | 226 pF | 4 + j38 Ω | 1.55 mW | 48 + j2 Ω | 115 mW |

In TABLE 1, the "Tuning" column indicates the two options being compared, namely 1 tag versus 30 tags. The "Reactance" column indicates the corresponding reactance of the reactive components coupled to the antenna in order to perform impedance matching for the indicated number of tags. Here, the reactive components are a series capacitor (e.g., a capacitor in a series connection between the RFID reader and the antenna) and a shunt capacitor (e.g., a capacitor in a shunt connection between the RFID reader and the antenna). The specific reactance of the reactive components coupled to the antenna may be determined by measurement during system configuration, as further discussed below. The "When reading 1 tag" columns indicate the impedance and power required to read 1 tag, based on whether the antenna is tuned for 1 tag or 30 tags. The "When reading 30 tags" columns indicate the impedance and power required to read 30 tags, based on whether the antenna is tuned for 1 tag or 30 tags.

As can be seen, when the antenna is tuned for 1 tag, the selected capacitance values result in an impedance of 52+j3 Ohms, which is a good impedance match to the 50 Ohm impedance of the RFID reader. As a result, only 0.5 mW is required to perform the read. However, when a stack of 30 tags is placed on this antenna, the impedance changes dramatically to 5-j9 Ohms and to read all 30 chips requires 603 mW of power, due to the impedance mismatch with the RFID reader.

By comparison, when the antenna is tuned for 30 tags, the selected capacitance values result in an impedance of 48+j2 Ohms, which is a good impedance match to the 50 Ohm impedance of the RFID reader. As a result, only 115 mW of power is required to perform the read, which is an improvement of 7.2 dB in efficiency (versus the 603 mW of the other tuning). Admittedly, tuning the antenna in this manner does require 3 times more power to read the single chip, but this inefficiency is very acceptable at just 1.55 mW.

In other words, by tuning the antenna to match the impedance for a stack of RFID tags, the required minimum power is increased (e.g. 0.5 to 1.55 mW) and the required maximum power is decreased (e.g. 603 to 115 mW). Although the power efficiency is reduced by a small amount (e.g. approximately 1 mW) when reading the single tag, it is improved by a large amount (e.g. approximately 490 mW) when reading larger number of tags. As a result, the overall power efficiency of the system is improved.

TABLE 2 shows various antenna types that may be used on a roulette table, such as the roulette table 100 (see FIG. 1).

TABLE 2

| Betting area | Size (mm) | Shape | Configuration | Turns |
|---|---|---|---|---|
| Main number spot | 47 × 70 | Rectangular | Loop | 3 |
| Horizontal line | 29 × 70 | Rectangular | Loop | 3 |
| Cross | 28 × 28 | Rectangular | Loop | 5 |
| Vertical line | 28 × 47 | Rectangular | Loop | 4 |

TABLE 2-continued

Figure 8:
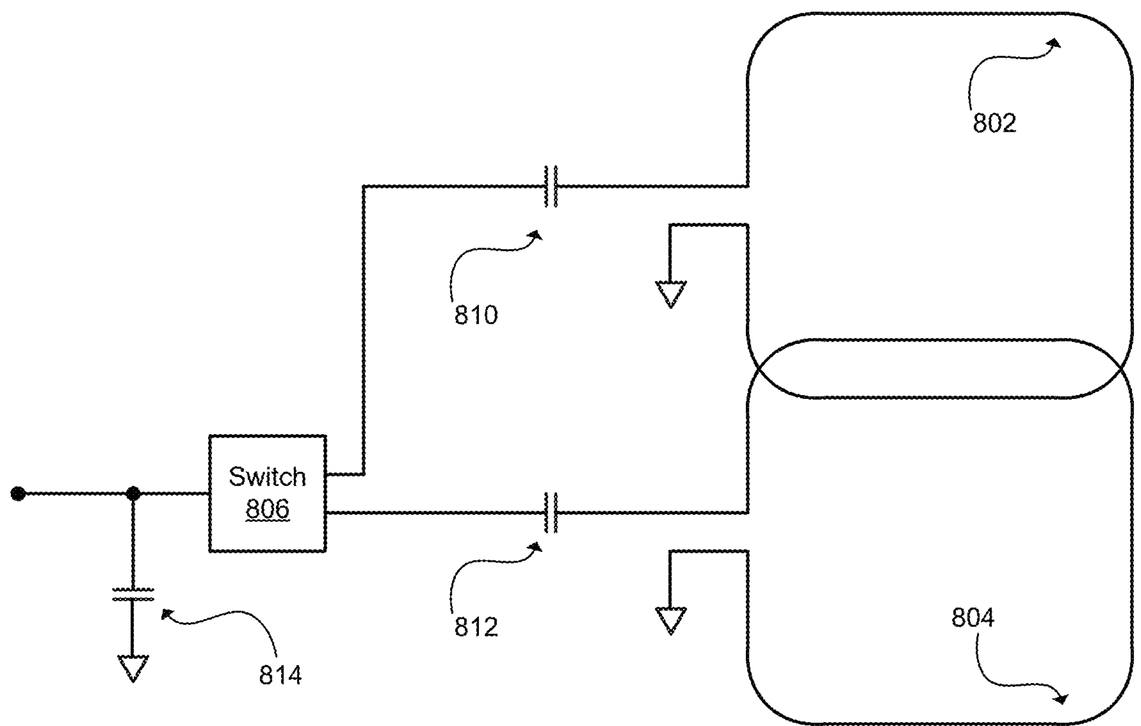
FIG. 8 is a top view of an antenna arrangement 800 that covers an area on a gaming table.

| Betting area | Size (mm) | Shape | Configuration | Turns |
|---|---|---|---|---|
| Column | 70 × 90 | Rectangular | Dual figure-8 | 2 |
| Group of 12 | 68 × 325 | Rectangular | Dual figure-8 | 1 |
| Red/Black | 90 × 180 | Rectangular | Dual figure-8 | 2 |
| Racetrack number spot | 30 | Circular | Loop | 4 |
| Internal racetrack A | 42 × 180 | Rectangular | Dual figure-8 | 2 |
| Internal racetrack B | 42 × 160 | Rectangular | Dual figure-8 | 2 |

In TABLE 2, each antenna type is associated with a betting area and has a size, a shape, a configuration, and a number of turns.

The "Betting area" column indicates the type of betting area on the roulette table, as follows. The main number spot area is associated with each of the 36 numbered betting areas in the 3×12 grid. The horizontal line area is associated with the horizontal line between two of the 36 numbered betting areas, for placing a bet on both numbers (e.g. 5, 8). The cross area is associated with the intersection between four of the 36 numbered betting areas, for placing a bet on all 4 numbers (e.g. 5, 6, 8, 9). The vertical line area is associated with the vertical line between two of the 36 numbered betting areas, for placing a bet on both numbers (e.g. 5, 6). The column area is associated with each column of 3 numbers, for placing a bet on all 3 numbers (e.g. 13, 14, 15). The group of 12 area is associated with each of the 3 areas labeled "1st 12", "2nd 12" and "3rd 12". The red/black area is associated with each of the 6 areas labeled "red", "black", "1-18", "19-36", "even" and "odd". The racetrack number spot is associated with each of the 37 numbered betting areas surrounding the racetrack area. The internal racetrack A and B are associated with each of the 4 areas within the racetrack area labeled "Series 5/8", "Orphelins", "Series 0/2/3" and "0-Game", with the A area associated with the larger two areas and the B area associated with the smaller two areas.

The "Size" column indicates the size of the antenna. The "Shape" column indicates the shape of the antenna. The "Configuration" indicates whether the antenna is configured as a loop or as a figure-8. A figure-8 antenna has two loops, with the antenna wire crossing in the middle between the loops; as a result, the field in one loop has a 180 degree phase shift from the field in the other loop. A dual figure-8 antenna has two figure-8 antennas offset so that the second figure-8 covers the null zone between the two loops of the first figure-8 antenna. The "Turns" column indicates the number of turns that the antenna has. A single turn may be visualized for a circular antenna as the antenna wire turning 360 degrees, two turns correspond to 720 degrees, three turns correspond to 1080 degrees, four turns correspond to 1440 degrees, etc. All of these parameters affect the values of the reactance components coupled to each antenna for impedance matching.

More generally, the antenna types of TABLE 2 may be categorized into three general types: Spot, line and cross. The spot type generally covers an area, for example corresponding to a given betting spot. The line type generally covers a border between two betting areas, for example corresponding to a bet on both of those numbers. The cross type generally covers the intersection between four betting areas, for example corresponding to a bet on all four of those numbers. The number of betting spots, their arrangement and sizes, etc. may be adjusted as desired, with corresponding adjustment to the size, shape, configuration and number of turns for the associated antenna.

Once the antenna types have been selected, reactance circuits for each antenna may be configured to match impedance for a stack of tags. For example, as discussed above with reference to TABLE 1, the racetrack number spot antenna (see also TABLE 2) has a size of 30 mm, a circular shape, a loop configuration and 4 turns; when tuned to impedance match for 30 tags, the corresponding reactance circuits include a series capacitor at 194 pF and a shunt capacitor at 226 pF. The other antennas on the roulette table 100 may be tuned in a similar manner. For example, the impedance may be measured for a stack of 30 tags, and the reactance of the reactance circuits (e.g., one or more of capacitors and inductors in one or more of series and shunt configurations) may be adjusted until a reasonable match is achieved. A network analyzer device may be used to perform the impedance matching, for example by measuring the reflection coefficient and adjusting the reactance in response to the measurement.

TABLE 3 provides an example of the tunings for three of the antenna types shown in TABLE 2 to match a stack of 30 RFID tags.

TABLE 3

| | Tuning for reactive components | |
|---|---|---|
| Type | Series capacitor | Shunt capacitor |
| Circular 30 mm loop with 4 turns | 194 pF | 226 pF |
| Circular 90 mm loop with 2 turns | 220 pF | 750 pF |
| Rectangular 29 × 70 mm loop with 3 turns | 54 pF | 120 pF |

In TABLE 3, it can be seen how the reactance values of the reactive components vary based on the type of antenna.

Figure 5:
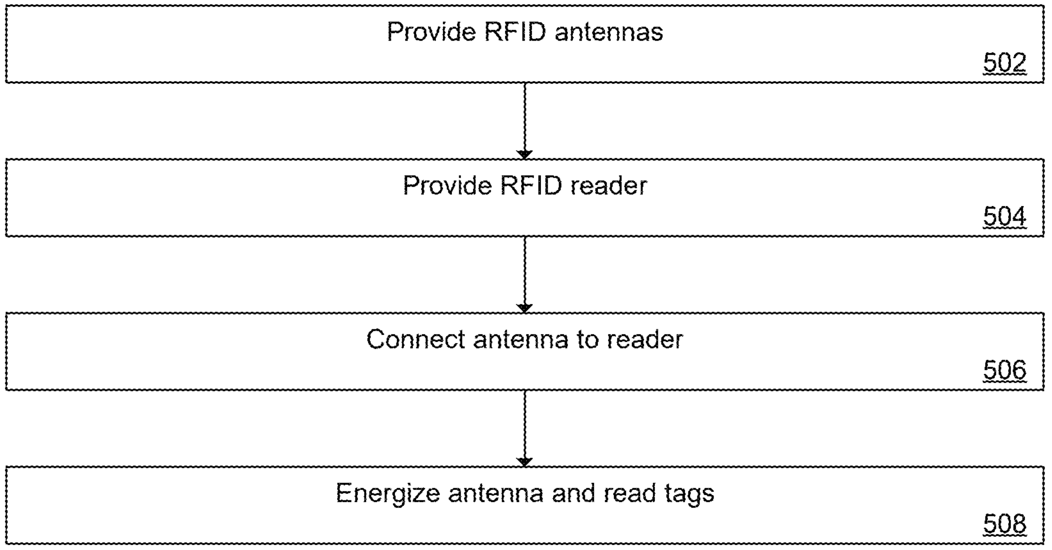
FIG. 5 is a flowchart of a method 500 of determining locations of objects in a gaming environment.

FIG. 5 is a flowchart of a method 500 of determining locations of objects in a gaming environment. The method 500 may be performed on the roulette table 100 (see FIG. 1) using the RFID system 200 (see FIG. 2).

At 502, a number of radio-frequency identification (RFID) antennas arranged at a plurality of locations on a gaming table are provided. For example, the antennas may have the various types listed in TABLE 2 and may be arranged in the betting areas of the roulette table 100 as discussed above.

At 504, an RFID reader coupled to the RFID antennas is provided. For example, the RFID system 200 may be integrated into the roulette table 100, and the RFID system 200 may include one or more RFID readers 204 that are coupled to the RFID antennas on the roulette table 100.

As discussed above, each of the antennas is impedance matched with a stack of RFID tags with a first impedance matching value, where the first impedance matching value differs from a second impedance matching value for impedance matching the antenna with a single RFID tag. For example, TABLE 1 shows that the first impedance matching value is 48+j2 Ohms and the second impedance matching value is 52+j3 Ohms, resulting from the configuration of the reactive elements. As a result, the first impedance matching value results in a less efficient impedance matching than the second impedance matching value between the single RFID tag and the antenna. For example, TABLE 1 shows that when the reactive components are configured to match for tuning 30 tags, the power required is 1.55 mW, which is greater than the 0.5 mW required when the reactive tuning components are configured to match for tuning 1 tag.

At 506, a given antenna of the plurality of antennas is selectively connected to the RFID reader. For example, the controller 202 may control one of the multiplexers 206 to selectively connect one of the RFID readers 204 to one of the antennas 208.

At 508, the given antenna is energized with the RFID reader, where energizing the given antenna includes reading a subset of the plurality of RFID tags. For example, the controller 202 may instruct the given RFID reader 204 to perform a read of the given antenna 208 (see 506); the controller 202 then associates the tag identifiers resulting from the read with the betting spot corresponding to the given antenna.

The RFID system 200 may then perform the method 500 on other of the antennas on the roulette table 100. In this manner, the RFID system 200 can determine the amount of bets placed at the various locations on the roulette table 100.

2. Dynamic Antenna Tuning

The antenna tuning system described above in Section 1 works well, but sensitivity is limited by an inherent conflict resulting from a fixed tuning circuit. Specifically, the antenna tuning described in Section 1 shifts the antenna matching to be biased for taller stacks of tags, with the resulting increase in power and inefficiency when reading smaller numbers of tags. The RFID systems described in Section 2 address these issues.

Figure 6:
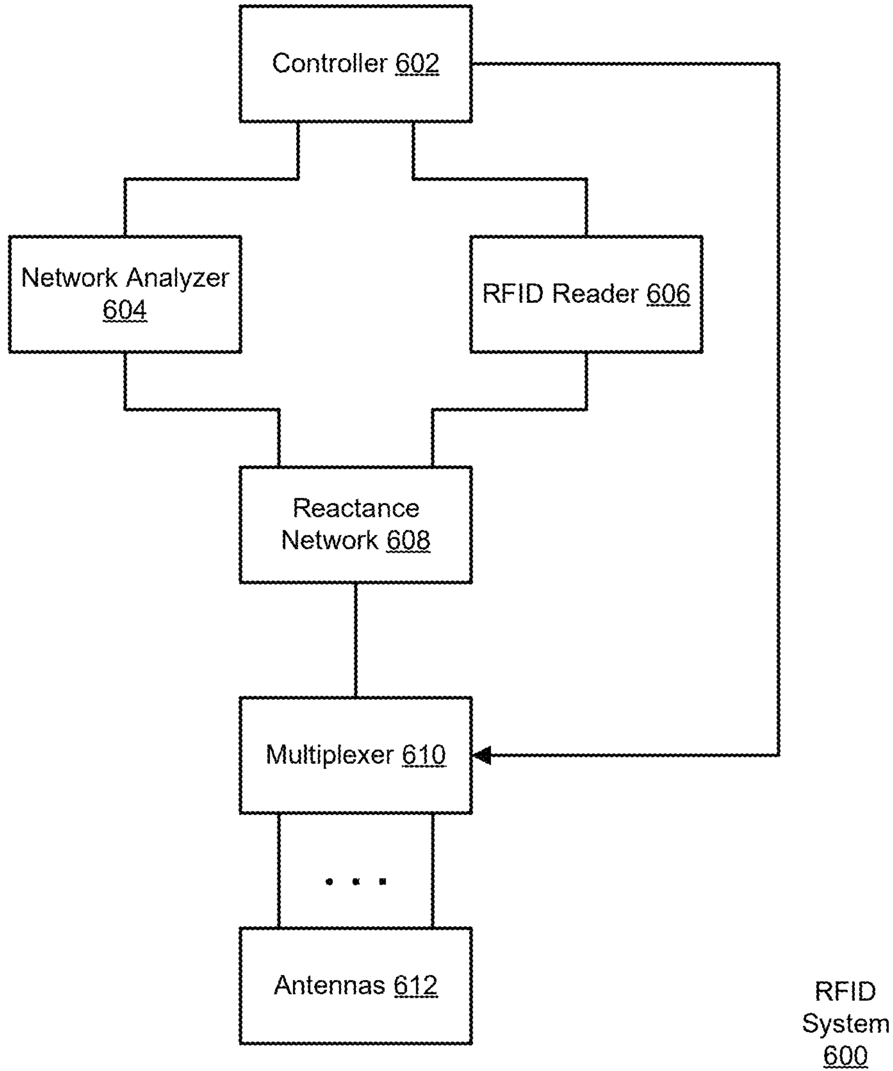
FIG. 6 is a block diagram of a RFID system 600.

FIG. 6 is a block diagram of a RFID system 600. The RFID system 600 may be integrated into a roulette table (e.g. the roulette table 100 of FIG. 1), in a manner similar to that described above regarding the RFID system 200 (see FIG. 2). The RFID system 600 includes a controller 602, a network analyzer 604, an RFID reader 606, a reactance network 608, a multiplexer 610, and antennas 612.

The controller 602 generally controls the operation of the RFID system 600. The controller 602 sends commands to the other components of the RFID system 600 and receives data from the other components in response to the commands. The controller 602 may store a RFID tag database that contains the RFID tag identifiers of the RFID tags in use at the roulette table. The controller 602 may manage game states and various events of the roulette game. The controller 602 may be implemented by a personal computer or other device that includes a processor. The controller 602 may be otherwise similar to the controller 202 (see FIG. 2).

The network analyzer 604 generally measures a reflection coefficient S11 of a selected one of the antennas 612. The reflection coefficient, also referred to as the reflectance, is a parameter that describes how much of a wave is reflected by an impedance discontinuity in the transmission medium, in this case a selected one of the antennas 612. The reflection coefficient is the ratio of the complex amplitude of the reflected wave to that of the incident wave. The network analyzer 604 may measure the reflection coefficient in a manner similar to that described in U.S. Application Pub. No. 2016/0217645.

The RFID reader 606 generally outputs a read command, which includes energizing a selected one of the antennas 612 and receiving responses from the RFID tags energized by the field. The RFID reader 606 may be otherwise similar to the RFID reader 204 (see FIG. 2).

The reactance network 608 generally includes a number of reactive elements, including capacitors, inductors, etc. that may be connected in various configurations, including in series configurations, in shunt configurations, etc. The reactance network 608 is responsive to a command from the controller 602 that selects a particular set of reactive elements and their configuration to result in a particular reactance. The reactance network 608 may include specific configurations of elements where a particular configuration is selected. For example, when there are 10 types of antennas that can each be tuned to 5 different stack heights (e.g. 30, 20, 10, 5, 1), the reactance network may include 50 configurations of reactive elements. Alternatively, the reactance network 608 may include a first configurable set of reactive elements that may be connected in a series configuration, and a second configurable set of reactive elements that may be connected in a shunt configuration. For example, the first set may include four series capacitors with sizes of 200, 100, 50 and 25 pF; selecting one or more (or selecting none) results in a series capacitance that is selectable from 0 to 375 pF in 25 pF increments.

The multiplexer 610 selectively connects the reactive network 608 to one of the antennas 612 in response to a command from the controller 602. The selected antenna 612 then connects via the reactive network 608 (having a selected configuration) to the network analyzer 604 to measure the reflection coefficient of the selected antenna, or to the RFID reader 606 to read the RFID tags in the vicinity of the selected antenna.

The antennas 612 are located on various locations on the roulette table 100, similar to that described above regarding the antennas 208 (see FIG. 2). The antennas 612 have various types, such that those detailed above in TABLE 2.

The RFID system 600 may include multiple RFID readers, multiple reactance networks, and multiple multiplexers, where each RFID reader is associated with one of the reactance networks, one of the multiplexers, and one set of the antennas. This allows the controller 602 to control multiple RFID readers to perform read operations at overlapping times.

The RFID system 600 may be used to implement a dynamic tuning system, as discussed below.

2.1 Dynamic Tuning System

When configured to implement a dynamic tuning system, the RFID system 600 generally operates as follows. The controller 602 first measures the reflection coefficient S11 of a given antenna 612 using the network analyzer 604 and then adjusts the tuning of the reactance network 608 to properly match the given antenna 612. Because the RFID system 600 is dynamically tuning the given antenna 612, it may use antennas with high Q with the resonance tuning adjusted to best match the operating frequency, e.g. 13.56 MHZ, irrespective of whether there is only 1 tag or multiple tags in the excitation field. Then the controller 602 instructs the RFID reader 204—which is selectively connected to the given antenna 612 by way of the multiplexer 610—to excite the given antenna 612 using the selected tuning for optimal performance.

Figure 7:
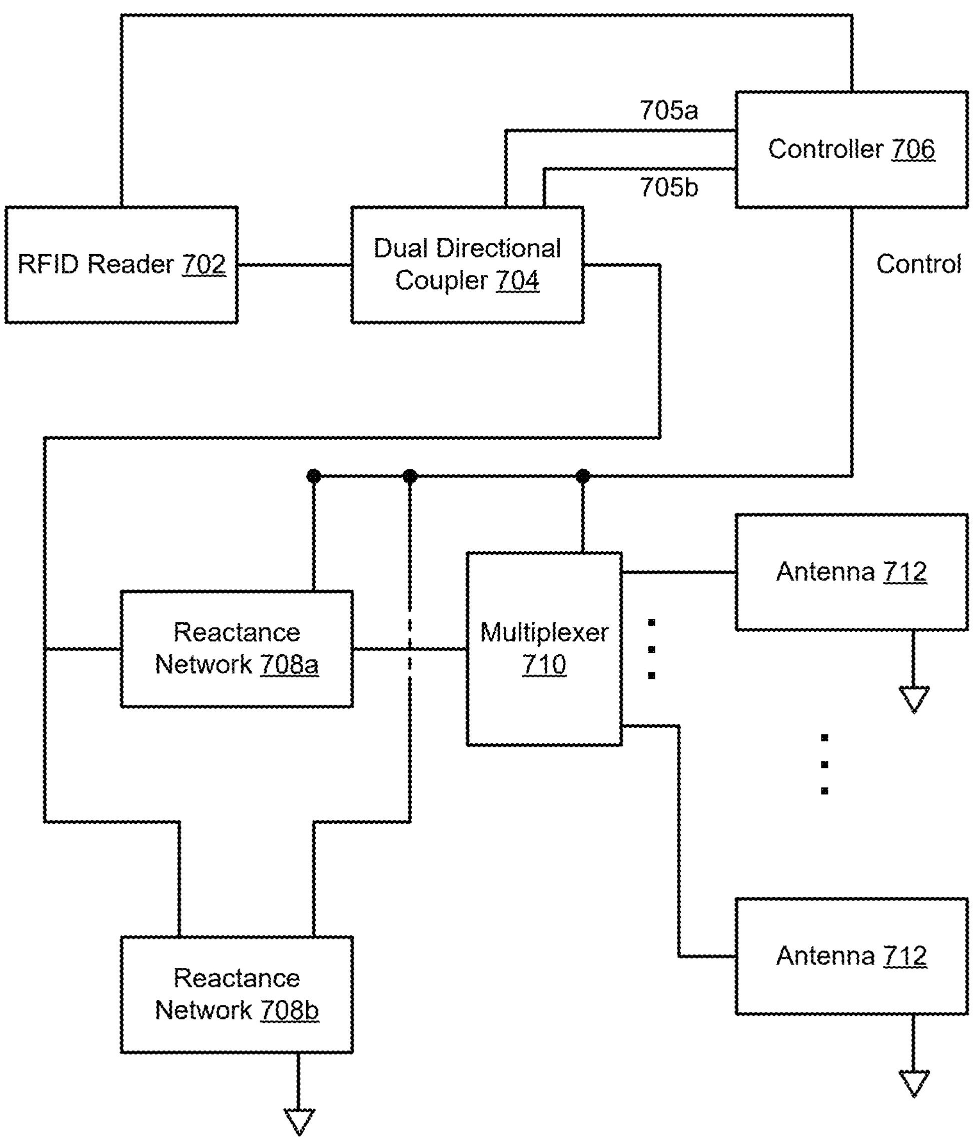
FIG. 7 is a block diagram of an RFID system 700 that implements a dynamic tuning system.

Alternatively, the dynamic tuning system may be implemented without a network analyzer, as detailed regarding FIG. 7.

FIG. 7 is a block diagram of an RFID system 700 that implements a dynamic tuning system. The RFID system 700 includes an RFID reader 702, a dual directional coupler 704, a controller 706, a series reactance network **708*a*, a shunt reactance network 708*b*, a multiplexer 710, and antennas 712**.

The RFID reader 702 performs a read operation, including energizing a selected one of the antennas 712 and receiving responses from RFID tags near the selected antenna. The RFID reader 702 may be otherwise similar to the RFID reader 204 (see FIG. 2), the RFID reader 606 (see FIG. 6), etc.

The dual directional coupler 704 taps off the energy of the excitation signal and the energy of the return signal during the read operation. The dual directional coupler 704 receives the excitation energy from the RFID reader 702, provides the excitation energy to the reactance networks 708*a* and 708*b*, and provides a forward signal 705*a* to the controller 706. The dual directional coupler 704 receives the responses from the RFID tags, provides them to the RFID reader 702, and provides a reflected signal 705*b* to the controller 706.

The controller 706 receives the forward signal 705*a* and the reflected signal 705*b* from the dual directional coupler 704 and measures the reflection coefficient based on the forward signal 705*a* and the reflected signal 705*b*. Based on the reflection coefficient, the controller 706 controls the reactance networks 708*a* and 708*b* to adjust the series reactance and the shunt reactance. The controller 706 may then instruct the RFID reader 702 to perform another read operation that uses the adjusted reactance values.

The series reactance network 708*a* couples the RFID reader 702 to a selected one of the antennas in a series configuration of reactive elements, and the shunt reactance network 708*b* couples the RFID reader to the selected antenna in a shunt configuration of reactive elements. The reactance networks 708*a* and 708*b* each include a number of reactive elements, including capacitors, inductors, etc. The reactance networks 708*a* and 708*b* may include elements having different reactance values, and the controller 706 may select one or more in order to obtain a desired reactance value. For example, the series reactance network 708*a* may include four capacitors with values of 200, 100, 50 and 25 pF; this allows the selection of any capacitance value from 0 to 375 pF in 25 pF increments. The shunt reactance network 708*b* may include 5 capacitors with values of 400, 200, 100, 50 and 25 pF; this allows the selection of any capacitance value from 0 to 775 pF in 25 pF increments. As a result, the reactance networks 708*a* and 708*b* can selectively provide an appropriate reactance for any of the antennas on the roulette table (see, e.g., the antenna types listed in TABLE 2).

The multiplexer 710 couples the reactance networks 708*a* and 708*b* to a selected one of the antennas 712, as selected by the controller 706. In this manner, the selected antenna 712 is coupled to the RFID reader 702 via the reactance networks 708*a* and 708*b*. The multiplexer 710 may be implemented by a radio frequency switch.

The antennas 712 are associated with various locations on the roulette table (e.g., the betting areas discussed above regarding the roulette table 100 of FIG. 1). The antennas 712 come in a variety of types, such as the types listed in TABLE 2, and quantities. The antennas 712 may be otherwise similar to the antennas 208 (see FIG. 2), 612 (see FIG. 6), etc.

As compared to the RFID system 600 (see FIG. 6), note that the RFID system 700 omits a network analyzer. Instead, the RFID system 700 may perform one or more additional reads if the current read results in a suboptimal return signal, as determined by the controller 706 by analysis of the forward and reflected signals.

2.2 Selective Tuning Network

Alternatively, the RFID system 700 may implement a selective tuning network by replacing the reactance networks 708*a* and 708*b* with specifically configured selections of series and shunt reactance elements. For example, the antennas 712 may include 10 different types of antennas (e.g., the types listed in TABLE 2). A given antenna type has a number of matching reactance configurations that correspond to various RFID tag stack heights. For example, a given antenna may have 5 matching reactance configurations corresponding to 5 stack heights (e.g. 30, 20, 10, 5, 1). As a specific example for the circular 30 mm loop antenna with 4 turns (see TABLE 3), the tuning for a stack of 30 RFID tags is a series capacitance of 194 pF and a shunt capacitance of 226 pF. This antenna then has four other pre-configured reactance configurations corresponding to 20, 10, 5 and 1 RFID tag. Thus, for 10 antenna types and 5 stack heights, the selective tuning network includes 50 selectable configurations of reactance elements. When the first RFID read operation on an antenna results in a mismatch, the controller 706 selects another of the pre-configured reactance configurations for that antenna.

In summary, the dynamic antenna tuning of Section 2 enables a number of differences from the antenna tuning of Section 1. First, dynamic antenna tuning enables the use of antennas with a higher Q, which results in an increased field strength (for a given power level) and the ability to read taller stacks of RFID tags. Second, dynamic antenna tuning enables the use of a reactance network that is shared among multiple antennas, instead of each antenna having its own, separate reactance configuration.

These features enable a number of improvements from existing systems. First, they allow the tuning of the resonance of a given antenna to be dynamically changed to match the sensitivity of the given antenna, which improves the efficiency of the system (e.g., power savings of the excitation field generated by the RFID reader). Second, they allow the tuning of the resonance of the RFID reader to be dynamically changed according to the differing resonances of antennas that have different types (e.g., different sizes, different shapes, different numbers of turns, etc.). Third, they allow the tuning of a given antenna to be dynamically changed as different numbers of RFID tags are placed within the magnetic field (also referred to as the H field) generated by the given antenna when energized.

3. Fast Scanning of Antennas

U.S. Application Pub. No. 2016/0217645 discusses using a network analyzer device to measure the change in reflection coefficient S11 of an antenna in the presence of different numbers of RFID tags. However, the systems described in U.S. Application Pub. No. 2016/0217645 have a number of issues. One issue is that the systems described in U.S. Application Pub. No. 2016/0217645 do not work well for larger antennas. This issue is problematic for roulette, where some betting spots have a larger area. Increasing the size of the antenna does not work well, because the larger antenna results in a diminished flux density which reduces the change in S11 such that the presence of RFID tags is difficult to detect. TABLE 4 gives an example of attempting to measure S11 with a larger antenna.

TABLE 4

| Number of tags | Reflection coefficient S11 |
|---|---|
| 0 | (47.6 + j1.8) Ω |
| 1 | (47.7 + j1.4) Ω |
| 2 | (47.7 + j1.2) Ω |
| 3 | (47.8 + j0.7) Ω |

In TABLE 4, the reflection coefficient S11 is measured for four tag quantities using a 13×30 cm loop antenna matched to 50 Ohms at an excitation frequency of 13.56 MHz. As can be seen, the measurements are very close together, making it difficult to distinguish between 0-3 tags.

To address these issues, Section 3 describes using multiple antennas to detect RFID tags spread over a larger area. Using multiple antennas keeps the flux density high enough to ensure a measurable change in S11. The multiple antennas may be configured as loops, as overlapping loops, as figure- 8 antennas, as overlapping figure-8 antennas, etc. TABLE 5 gives an example of measuring S11 with a figure-8 antenna.

TABLE 5

| Number of tags | Reflection coefficient S11 |
|---|---|
| 0 | (36.1 + j6.5) Ω |
| 1 | (37.7 + j4.4) Ω |
| 2 | (39.8 + j0.7) Ω |
| 3 | (41.1 − j6.7) Ω |

In TABLE 5, the reflection coefficient S11 is measured for four tag quantities using a 7×24 cm figure-8 antenna matched to 50 Ohms at an excitation frequency of 13.56 MHz. As can be seen, the differences among the measurements are greater than those in TABLE 4, making it easier to distinguish between 0-3 tags.

The 13×30 cm area of the 13×30 cm loop antenna may then be covered by multiple 7×24 cm figure-8 antennas (e.g., using 4 figure-8 antennas). This allows the network analyzer, which returns results much faster than the RFID reader, to perform a fast scan to determine which antenna has tags thereon, thus reducing the time it takes to read all the antennas on the roulette table.

However, using multiple antennas to cover an area presents new technical challenges. The multiple antennas magnetically couple and thereby distort the resulting magnetic field from the expected magnetic field, creating unwanted constructive interference (referred to as hot spots) and destructive interference (referred to as nulls). If the flux density is too low, changes in the reflection coefficient when tags are placed in the in the low-flux area are undetectable and the fast scanning features are unavailable. Section 3 discusses ways to increase the flux density in large areas.

FIG. 8 is a top view of an antenna arrangement 800 that covers an area on a gaming table. The antenna arrangement 800 includes two antennas 802 and 804 that are coupled via a radio frequency switch 806 to other components (not shown) such as a network analyzer, a RFID reader, etc. The antennas 802 and 804 are slightly overlapping in order to radiate the field over the entirety of the area and to avoid a gap in coverage. The antenna arrangement 800 also has reactive elements that may include capacitors and inductors. Here, the antenna arrangement 800 includes a capacitor 810 coupled to the antenna 802 in series, a capacitor 812 coupled to the antenna 804 in series, and a capacitor 814 in a shunt configuration between the network analyzer and the switch 806. The reactive elements may match the antennas 802 and 804 to 50 Ohms, which is a common radio frequency design impedance, at 13.56 MHz.

For the antennas 802 and 804, considered by themselves in the absence of the other components, there is the potential for magnetic coupling between the antennas when the network analyzer measures the reflection coefficient. However, the placement of the shunt capacitor 814 on the opposite side of the switch 806 from the antennas 802 and 804 prevents a conductive loop from forming from one antenna (e.g. 802) through the other antenna (e.g. 804) to ground. (If a shunt element is placed on the same side of the switch as the antenna, then the shunt element of one antenna completes a connection to ground when the other antenna is energized, resulting in magnetic coupling.) This placement of the reactive element on the opposite side of the switch from the antenna (or alternatively, on the same side of the switch as the network analyzer) may also be referred to as inboard placement.

The antenna arrangement 800 generally operates as follows. The antennas 802 and 804 cover a betting spot on the roulette table, where the betting spot is sized such that using a single, larger antenna would result in a diminished flux density as discussed above. First, a network analyzer selectively measures the reflection coefficient of the antennas 802 and 804; when the antenna 802 is measured, the switch 806 connects the antenna 802, and the antenna 804 is an open loop; when the antenna 804 is measured, the switch 806 connects the antenna 804, and the antenna 802 is an open loop. When the quantity of chips that are energized by a given antenna changes, the measured reflection coefficient changes from the previous reflection coefficient measurement for the given antenna.

Second, based on comparing the measured reflection coefficients versus the previous measurements, an RFID reader selectively energizes the antennas in the antenna arrangement 800 to perform a read operation. When the reflection coefficient for none of the antennas 802 and 804 changes, no RFID read is needed because the current tags are the same tags that were present in the previous measurement. When the reflection coefficient for one of the antennas 802 and 804 changes, that particular antenna (e.g., 802) is connected via the switch 806 to the RFID reader, and the other antenna (e.g., 804) is an open loop; the RFID tags nearby that particular antenna then respond with their tag identifiers to the read energy. When the reflection coefficient for both of the antennas 802 and 804 changes, the switch 806 selectively connects the first antenna (e.g. 802) for the RFID reader to energize, and makes an open loop for the second antenna (e.g. 804), then the switch 806 selectively connects the second antennas (e.g. 804) for the RFID reader to energize, and makes an open loop for the first antenna (e.g. 802).

In summary, placing one or more reactive tuning elements inboard of the switch 806 enables the use of any number of antennas to be used to cover a defined area while maintaining the desired flux density. For example, the antennas may be selected from the antenna types listed in TABLE 2 and used to provide coverage on areas of various dimensions on a roulette table.

Figure 9:
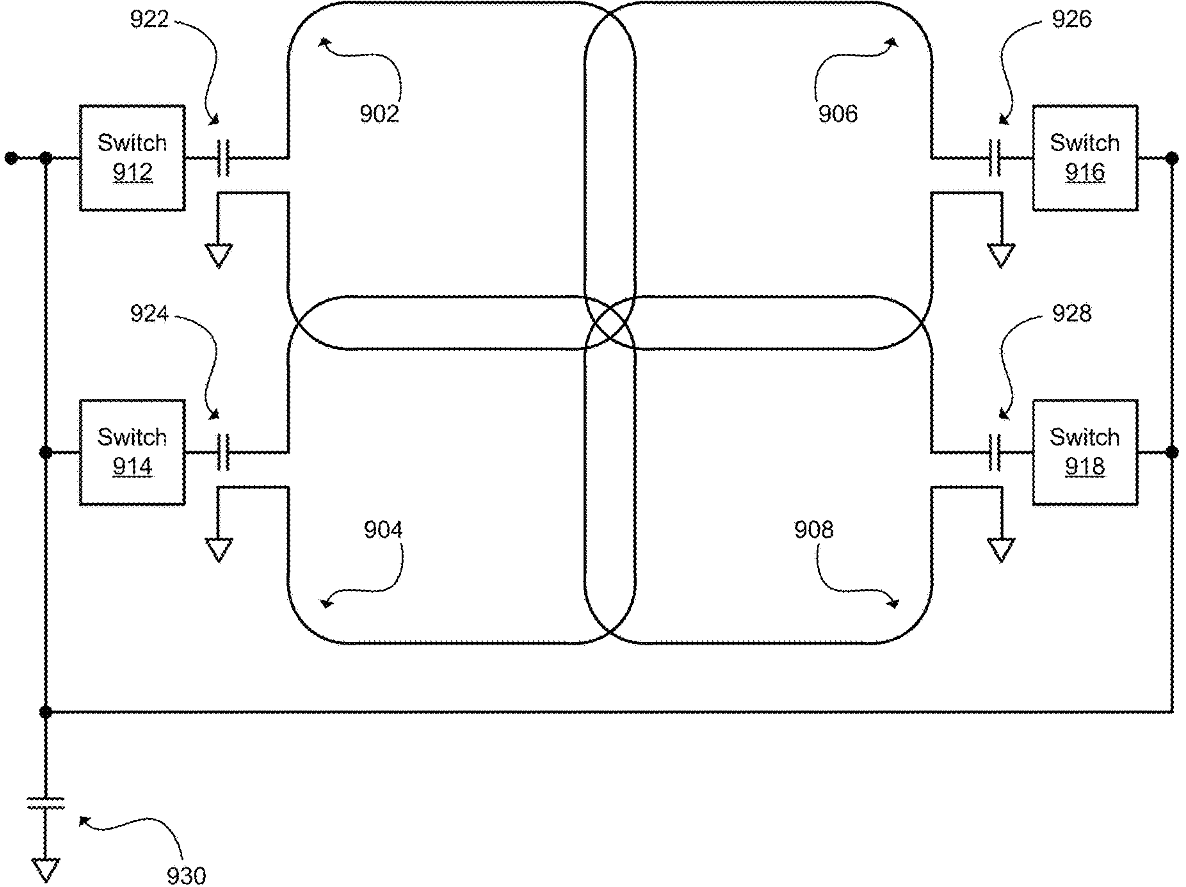
FIG. 9 is a top view of an antenna arrangement 900 that covers an area on a gaming table.

FIG. 9 is a top view of an antenna arrangement 900 that covers an area on a gaming table. The antenna arrangement 900 includes four antennas 902, 904, 906 and 908 that are coupled via four radio frequency switches 912, 914, 916 and 918 to other components (not shown) such as a network analyzer, a RFID reader, etc. The antennas 902, 904, 906 and 908 are slightly overlapping in order to radiate the field over the entirety of the area and to avoid a gap in coverage. The antenna arrangement 900 also has reactive elements that may include capacitors and inductors. Here, the antenna arrangement 900 includes a capacitor 922 coupled in series between the switch 912 and the antenna 902, a capacitor 924 coupled in series between the switch 914 and the antenna 904, a capacitor 926 coupled in series between the switch 916 and the antenna 906, and a capacitor 928 coupled in series between the switch 918 and the antenna 908; and a capacitor 930 in a shunt configuration between the network analyzer and the switches 912, 914, 916 and 918. The reactive elements may match the antennas 902, 904, 906 and 908 to 50 Ohms at 13.56 MHz. As with the antenna arrangement 800, using the capacitor 930 as a shared (or common) shunt capacitor among the antennas 902, 904, 906 and 908, and placing the capacitor 930 between the network analyzer and the switches 912, 914, 916 and 918, avoids magnetic coupling between the closely-placed antennas.

The antenna arrangement 900 may operate in a similar manner to the antenna arrangement 800 (see FIG. 8) discussed above.

Figure 10:
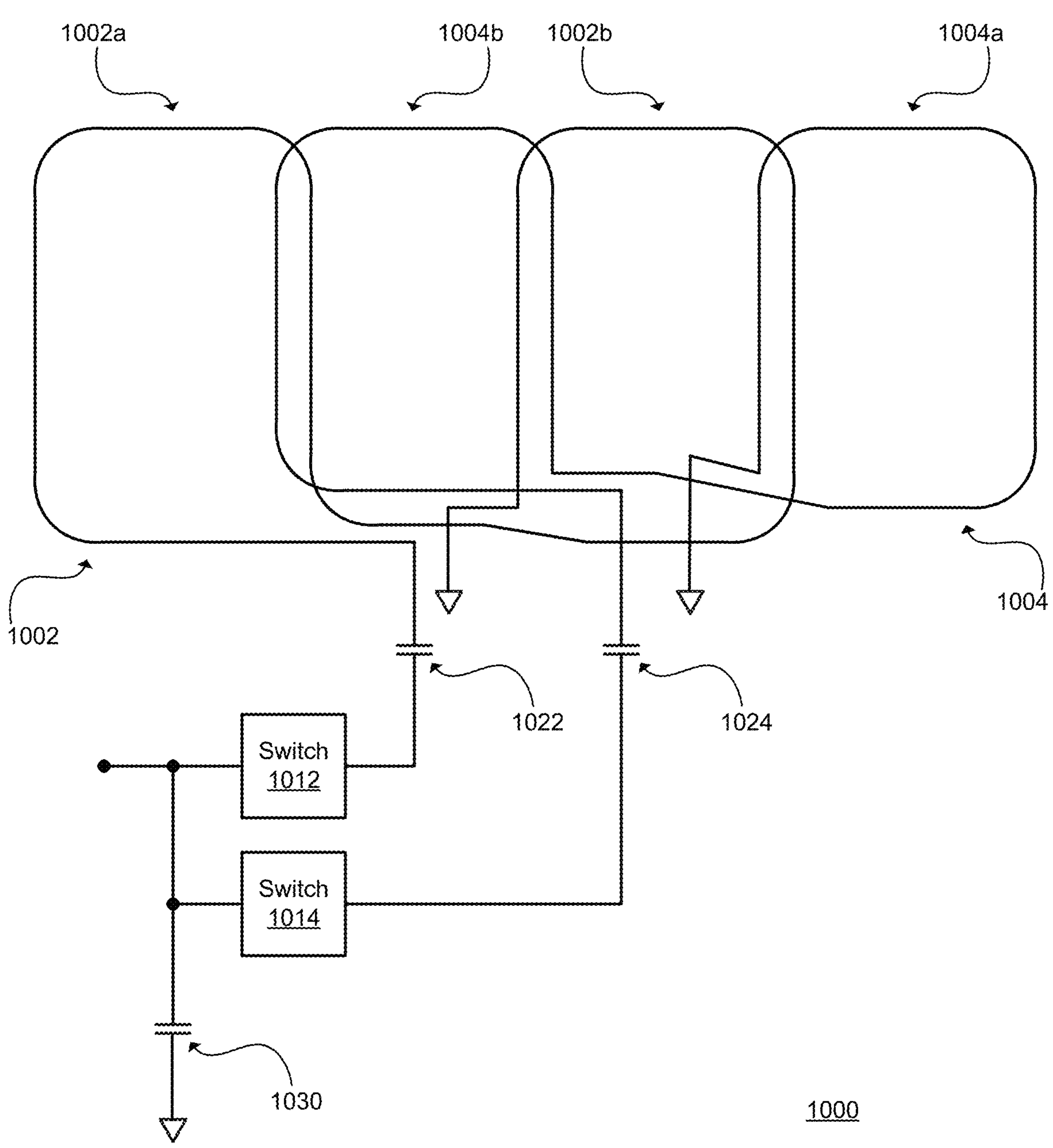
FIG. 10 is a top view of an antenna arrangement 1000 that covers an area on a gaming table.

FIG. 10 is a top view of an antenna arrangement 1000 that covers an area on a gaming table. The antenna arrangement 1000 includes two figure-8 antennas 1002 and 1004. Each of the antennas 1002 and 1004 is in a figure-8 shape with two loops (1002*a* and 1002*b*, and 1004*a* and 1004*b*). The loops of the antennas 1002 and 1004 are slightly overlapping (e.g. the loop 1004*b* overlaps the loops 1002*a* and 1002*b*) in order to radiate the field over the entirety of the area and to avoid a gap in coverage. Figure-8 antennas exhibit a null between the two loops. This null area can be mitigated by spacing the loops such that the loop of one antenna covers the null area of the other antenna. For example, the loop 1004*b* covers the null of the antenna 1002, and the loop 1002*b* covers the null of the antenna 1004. The antennas 1002 and 1004 are coupled via two radio frequency switches 1012 and 1014 to other components (not shown) such as a network analyzer, a RFID reader, etc.

The antenna arrangement 1000 also has reactive elements that may include capacitors and inductors. Here, the antenna arrangement 1000 includes a capacitor 1022 coupled in series between the switch 1012 and the antenna 1002, and a capacitor 1024 coupled in series between the switch 1014 and the antenna 1004; and a capacitor 1030 in a shunt configuration between the network analyzer and the switches 1012 and 1014. The reactive elements may match the antennas 1002 and 1004 to 50 Ohms at 13.56 MHz. As with the antenna arrangements 800 and 900, using the capacitor 1030 as a shared (or common) shunt capacitor among the antennas 1002 and 1004, and placing the capacitor 1030 between the network analyzer and the switches 1012 and 1014, avoids magnetic coupling between the closely-placed antennas.

The antenna arrangement 1000 may operate in a similar manner to the antenna arrangement 800 (see FIG. 8) or the antenna arrangement 900 (see FIG. 9) discussed above.

Figure 11:
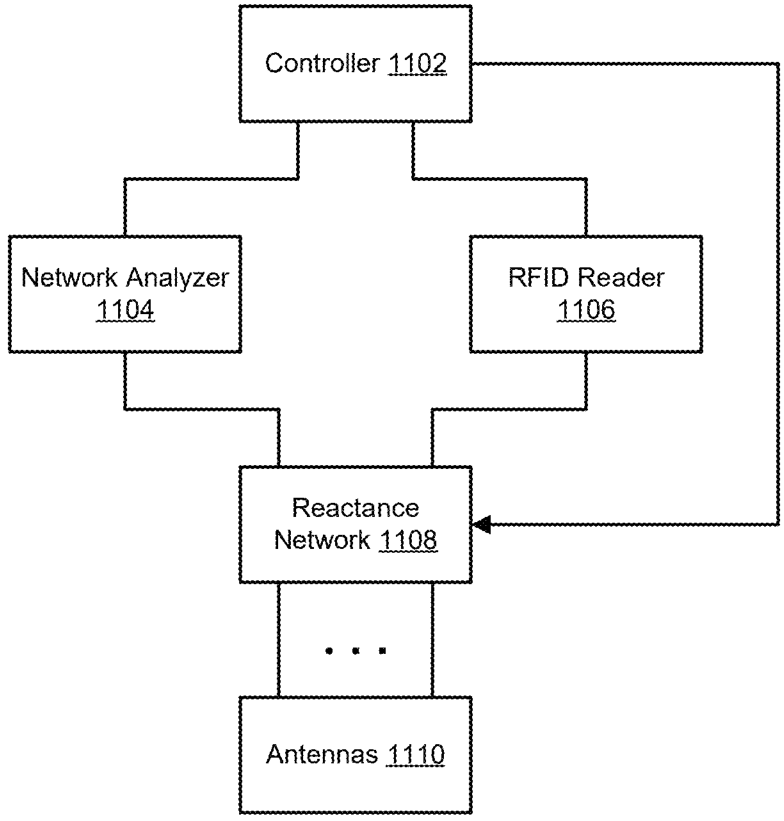
FIG. 11 is a block diagram of an RFID system 1100.

FIG. 11 is a block diagram of an RFID system 1100. The RFID system 1100 may be integrated into a roulette table (e.g. the roulette table 100 of FIG. 1), in a manner similar to that described above regarding the RFID system 200 (see FIG. 2), the RFID system 600 (see FIG. 6), the RFID system 700 (see FIG. 7), etc. The RFID system 1100 generally implements the fast scanning features described above, and may include other of the features described herein (e.g. Sections 1-2). The RFID system 1100 includes a controller 1102, a network analyzer 1104, an RFID reader 1106, a switchable reactance network 1108, and antennas 1110.

The controller 1102 generally controls the operation of the RFID system 1100, for example by sending control signals to the network analyzer 1104, the RFID reader 1106 and the switchable reactance network 1108, as detailed below. The controller 1102 may be otherwise similar to the controller 202 (see FIG. 2), the controller 602 (see FIG. 6), the controller 706 (see FIG. 7), etc. The controller 1102 may be implemented by a device that includes a processor, such as a personal computer.

The network analyzer 1104 measures a reflection coefficient of a selected one of the antennas 1110. Based on the reflection coefficient, the controller 1102 determines the approximate number of RFID tags present in the excitation field of the selected antenna and performs other operations. One such operation is configuring the switchable reactance network 1108 to an appropriate reactance value that matches the impedance of the selected antenna (because the RFID tags couple with the selected antenna and change its impedance), as described in Section 1 or Section 2. Another such operation is controlling the RFID reader 1106 to perform a read operation on the selected antenna and to provide the detected RFID tag identifiers, so that the controller 1102 can determine that specific RFID tags are present at the specific location on the roulette table corresponding to the selected antenna. Because the network analyzer generates results more quickly than the RFID reader 1106, the controller 1102 may control the RFID reader 1106 to read only those of the antennas 1110 that have tags present (or that have a change in tag quantities), which results in a time savings as compared to always reading all of the antennas 1110.

The RFID reader 1106 performs a read operation on the selected antenna of the antennas 1110. The read operation generally includes exciting the selected antenna, reading the responses of the RFID tags that respond to the excitation energy, and providing the RFID tags identifiers of the responding tags to the controller 1102. Because the controller 1102 has configured the switchable reactance network 1108 to an appropriate reactance value based on the reflection coefficient measured by the network analyzer 1104, the excitation energy is impedance matched to the selected antenna, and the read operation is performed more efficiently than might otherwise occur. The RFID reader 1106 may be otherwise similar to the other RFID readers described herein, including the RFID reader 204 (see FIG. 2), the RFID reader 606 (see FIG. 6), the RFID reader 702 (see FIG. 7), etc.

The switchable reactance network 1108 generally selectively connects one of the network analyzer 1104 and the RFID reader 1106 to a selected antenna of the antennas 1110 with a selectable, a configurable or an adjustable reactance value. The controller 1102 configures the appropriate reactance value based on the reflection coefficient measured by the network analyzer 1104. The switchable reactance network 1108 includes reactive elements such as capacitors, inductors, etc. in various series and shunt configurations. These various configurations of reactive elements correspond to the range of impedances desired for the various types of antennas on the roulette table (see e.g. TABLE 2). For example, the switchable reactance network 1108 may implement the antenna tunings described in Section 1, the dynamic antenna tunings described in Section 2, the specific capacitor arrangements of FIGS. 8-10, etc., including a number of radio frequency switches to connect the selected antenna to the network analyzer 1104 (or the RFID reader 1106), and to connect the selected reactance elements to the selected antenna.

The antennas 1110 are placed at various locations on the roulette table, for example the betting spots described above (see the roulette table 100 of FIG. 1 and related text). The antennas 1110 have various types, for example the types listed in TABLE 2. The antennas 1110 may be otherwise similar to the antennas 208 (see FIG. 2), the antennas 612 (see FIG. 6), the antennas 712 (see FIG. 7), the antennas 802 and 804 (see FIG. 8), the antennas 902, 904, 906 and 908 (see FIG. 9), the antennas 1002 and 1004 (see FIG. 10), etc. A given area on the roulette table may be associated with a single antenna (e.g., one of the antenna types listed in TABLE 2), or with multiple antennas (e.g., as described above regarding FIGS. 8-10).

As a specific example regarding the antenna arrangement 1000 (see FIG. 10), the controller 1102 controls the switchable reactance network 1108 (in FIG. 10, the switches 1012 and 1014, and the capacitors 1022, 1024 and 1030) and the network analyzer 1104 to selectively measure the reflection coefficient of the antennas 1002 and 1004. If the reflection coefficient changes for the selected antenna from the previous measurement, that means the RFID tags at the betting spot have changed, so the controller 1102 controls the RFID reader 1106, via one switch configuration, to energize the selected antenna to perform a read operation. The other antenna is selectively disconnected, via another switch configuration, to form an open loop.

The RFID system 1110 may implement other features in addition to the features described above. For example, the RFID reader 1106 may implement a persistence feature with the RFID tags. For persistence, when the RFID reader 1106 receives the identifier from a particular RFID tag, the RFID reader 1106 instructs that particular RFID tag to no longer respond during the current read operation. This allows the read cycle to proceed with no duplicate reads even if a tag is in an overlapped region of the antennas 1110. For example, the antenna loops 1002*a* and 1004*b* (see FIG. 10) are overlapping; an RFID tag located in the overlapped area will be energized by both antennas 1002 and 1004.

As mentioned above, measuring the reflection coefficient of the antennas 1110 (using the network analyzer 1104) prior to reading the RFID tags (using the RFID reader 1106) results in a time savings as compared to just using the RFID reader 1106 to read all of the antennas 1110. For example, the average time for an operation of the network analyzer 1104 is 0.3 milliseconds and for an operation of the RFID reader 1106 is 5 milliseconds; for a roulette table with 200 antennas, using the RFID reader 1106 to read all of the antennas 1110 takes 1000 milliseconds. In contrast, using the network analyzer 1104 to measure the reflection coefficient of all the antennas takes 60 milliseconds; if the controller 1102 determines that only 50 of the antennas 1110 need to be read (because the other 150 antennas do not have changed reflection coefficients), using the RFID reader 1106 to read that subset of antennas takes only 250 milliseconds. The net time is then 310 milliseconds (60+250), which is less than the 1000 milliseconds for reading all of the antennas 1110.

Figure 12:
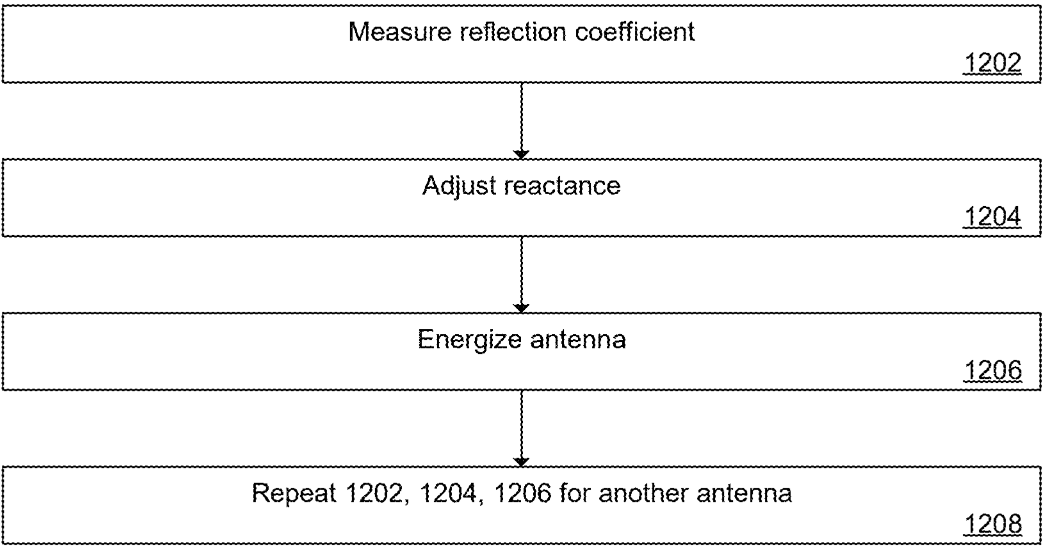
FIG. 12 is a flowchart of a method 1200 of determining locations of objects in a gaming environment.

FIG. 12 is a flowchart of a method 1200 of determining locations of objects in a gaming environment. The method 1200 may be performed on the roulette table 100 (see FIG. 1) using the RFID system 1100 (see FIG. 11).

At 1202, a reflection coefficient of a selected antenna of a number of antennas is measured. The antennas are arranged at a number of locations on a gaming table. For example, the roulette table 100 (see FIG. 1) may have a number of antennas (e.g. the types listed in TABLE 2) arranged to detect RFID tags at the various betting spots on the roulette table 100. At least some of the antennas are closely spaced, with multiple antennas covering a single betting spot, in order to fully cover the area while providing a desired flux density. The controller 1102 (see FIG. 11) may control the network analyzer 1104 to measure the reflection coefficient of the selected antenna by configuring the connection to the selected antenna through the switchable reactance network 1108.

At 1204, a reactance associated with the selected antenna is selectively adjusted based on the reflection coefficient having been measured (see 1202). For example, the controller 1102 (see FIG. 11) may adjust the reactance of the switchable reactance network 1108 based on the reflection coefficient of the selected antenna measured by the network analyzer 1104. If the reflection coefficient for the selected antenna has not changed from its previous measurement, the reactance need not be changed (e.g., selectively adjusted to remain unchanged). Because the antennas are closely spaced, the reactance adjustment uses an inboard shunt element in the switchable reactance network. For example, the switchable reactance network 1108 may include an inboard shunt capacitor (e.g. on the same side of the switch as the network analyzer, or on the opposite side of the switch from the selected antenna), such as the capacitor 814 (see FIG. 8), the capacitor 930 (see FIG. 9), the capacitor 1030 (see FIG. 10), etc.

As a further option, the steps 1202-1204 may be performed more than once. For example, if a second measurement of the reflection coefficient indicates an impedance mis-match, the reactance may be further adjusted.

At 1206, when the reflection coefficient of the selected antenna has changed from the previous measurement for the selected antenna, the selected antenna is energized, where energizing the selected antenna includes energizing one or more RFID tags nearby the selected antenna and receiving one or more RFID tag identifiers from the one or more RFID tags. For example, the RFID reader 1106 (see FIG. 11) may energize the selected antenna via the switchable reactance network 1108 using the reactance adjusted in 1204 to read the RFID tags in the vicinity of the selected antenna (e.g., the RFID tags located in a particular betting spot on the roulette table that is associated with the selected antenna). When the reflection coefficient has changed, this indicates that the RFID tags in the vicinity of the selected antenna have changed, so the RFID reader needs to perform a new read. However, when the reflection coefficient has not changed, this indicates that the RFID tags in the vicinity of the selected antenna have not changed, so the RFID reader does not need to perform a read using the selected antenna.

At 1208, the first antenna is de-selected, a second antenna is selected, and the steps 1202, 1204 and 1206 are performed using the second antenna.

The step 1208 may then be repeated for multiple antennas on the roulette table (e.g., less than all of the antennas on the roulette table, as determined according to the changed reflection coefficients). For example, the controller 1102 (see FIG. 11) may control the RFID system 1100 to selectively read the subset of the antennas 1110 that have changed reflection coefficients from the reflection coefficients measured in the previous read cycle. In this manner, the RFID system 200 can determine the amount of bets placed at the various locations on the roulette table 100, without needing to perform a RFID read on all the antennas 1110.

In summary, the fast scanning features of Section 3 enable a number of improvements over existing systems. First, using multiple antennas provides coverage over a larger area while avoiding coupling by selectively connecting one of the antennas and selectively disconnecting the other antennas. This decoupling is performed by placing tuning components outboard of the switch that is used for the selection. Second, using multiple antennas over the larger area maintains a defined flux density such that changes in the reflection coefficient when a RFID tag is present in the excitation field are measureable (e.g., as compared to using a single, larger antenna). Third, they result in time savings by using the reflection coefficient to control which antennas that the RFID reader reads (e.g. less than all of the antennas).

4. Instrumented Dolly

Section 4 describes an instrumented dolly that helps manage the game states in roulette. As mentioned above, a game of roulette may be arranged into three game states: Open Betting, Play, and Payout. The game logic is different for each game state. For example, bets are allowed to be placed or removed in the Open Betting state but not in the Play state. The game also includes various events, such as the bets locked event, the winning number event, and the end of game event. The events mark the transition from one game state to another. The instrumented dolly described herein helps to accurately define these transitions.

A dolly is a standard part of roulette. Once the ball falls into a specific slot on the wheel, the winning number is determined. In some embodiments, the winning number is sensed automatically; in other embodiments, the croupier simply announces the winning number.

In either case (automated or not), the dolly is placed on the winning number on the roulette table, and it is not removed until all winning bets are paid.

The instrumented dolly described herein adds instrumentation to the dolly. Specifically, the instrumented dolly includes an RFID tag having a unique identifier. This RFID-enabled dolly can then be used to automatically detect these events and to trigger the use of new game logic for the subsequent game state. Specifically, the instrumented dolly lives in one of two spots on the gaming table: On a dedicated resting spot (referred to as "parked"), or on the winning number.

Figure 13:
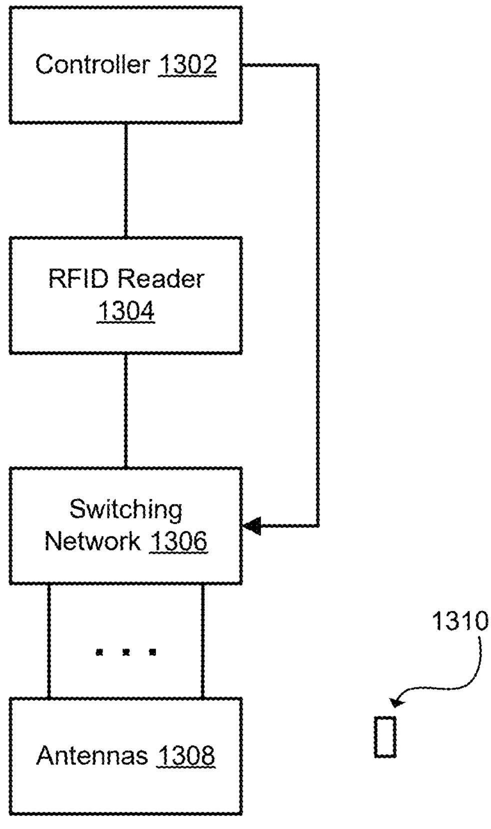
FIG. 13 is a block diagram of a RFID system 1300.

FIG. 13 is a block diagram of a RFID system 1300. The RFID system 1300 may be integrated into a roulette table (e.g. the roulette table 100 of FIG. 1), in a manner similar to that described above regarding the RFID system 200 (see FIG. 2), the RFID system 600 (see FIG. 6), the RFID system 700 (see FIG. 7), the RFID system 1100 (see FIG. 11), etc. The RFID system 1300 generally implements the instrumented dolly features described herein, and may include other of the features described herein (e.g. Sections 1-3). The RFID system 1300 includes a controller 1302, an RFID reader 1304, a switching network 1306, antennas 1308, and an instrumented dolly 1310.

The controller 1302 generally controls the operation of the RFID system 1300, for example by sending control signals to the RFID reader 1304 and the switching network 1306, as detailed below. The controller 1302 also manages the game states described above according to the results of detecting the location of the instrumented dolly 1310. The controller 1302 may be otherwise similar to the other controllers described herein, including the controller 202 (see FIG. 2), the controller 602 (see FIG. 6), the controller 706 (see FIG. 7), the controller 1102 (see FIG. 11), etc. The controller 1302 may be implemented by a device that includes a processor, such as a personal computer.

The RFID reader 1304 performs a read operation on a selected antenna of the antennas 1308. The read operation generally includes exciting the selected antenna, reading the responses of the RFID tags that respond to the excitation energy, and providing the RFID tags identifiers of the responding tags to the controller 1302. Specifically regarding the instrumented dolly 1310, the read operation reads the tag identifier of the instrumented dolly 1310 at the selected antenna, which corresponds to the betting spot with the winning number. The RFID reader 1304 may be otherwise similar to the other RFID readers described herein, including the RFID reader 204 (see FIG. 2), the RFID reader 606 (see FIG. 6), the RFID reader 702 (see FIG. 7), the RFID reader 1106 (see FIG. 11), etc.

The switching network 1306 generally connects the RFID reader 1304 to a selected antenna of the antennas 1308 using a plurality of switches. The switching network 1306 may also include a reactance network with a selectable, a configurable or an adjustable reactance value, similar to the switchable reactance network 1108 (see FIG. 11). The switching network 1306 may be otherwise similar to the other switching networks described herein, including the multiplexer 206 (see FIG. 2), the multiplexer 610 (see FIG. 6), the multiplexer 710 (see FIG. 7), the switchable reactance network 1108, etc.

The antennas 1308 are placed at various locations on the roulette table, for example the betting spots described above (see the roulette table 100 of FIG. 1 and related text). Specifically regarding the instrumented dolly 1310, because the instrumented dolly 1310 is placed on the winning number in the 3×12 grid of numbers 1-36 (see FIG. 1), the antennas 1308 correspond to the antennas in that area. One of the antennas 1308 may also be associated with the parking spot for the instrumented dolly 1310. The antennas 1308 have various types, for example the types listed in TABLE 2 that are used in the 3×12 grid area of the roulette table. The antennas 1308 may be otherwise similar to the antennas 208 (see FIG. 2), the antennas 612 (see FIG. 6), the antennas 712 (see FIG. 7), the antennas 802 and 804 (see FIG. 8), the antennas 902, 904, 906 and 908 (see FIG. 9), the antennas 1002 and 1004 (see FIG. 10), the antennas 1110 (see FIG. 11), etc.

The instrumented dolly 1310 contains a RFID tag that has a unique tag identifier. When a read operation by the RFID reader 1304 returns the tag identifier of the instrumented dolly 1310 at a selected antenna of the antennas 1308 (e.g., as routed via the switching network 1306 as configured by the controller 1302), the controller 1302 recognizes this as the winning number event and transitions the game state from the Play state to the Payout state. Optionally, the controller 1302 may also recognize the bets locked event when the RFID reader 1304 detects that the instrumented dolly has been removed from the parking area.

The controller 1302 and the instrumented dolly 1310 generally interact as follows. With the instrumented dolly 1310 parked, the controller maintains the game in the Open Betting state. Removing the instrumented dolly 1310 from the parked location—in the absence of other automated inputs—denotes the bets locked event. Placing the instrumented dolly 1310 on a numbered spot on the roulette table defines the winning number event and denotes the transition to the Payout state. Removing the instrumented dolly 1310 from the winning number defines the new game event, which represents the end of the Payout state and the transition from the current game to the Open Betting state in the next game.

In some embodiments, the bets locked event is determined automatically (e.g. via a speed sensor in the wheel). In other embodiments, a manual action by the dealer can define this event (e.g. the removal of the instrumented dolly 1310 from the parked location). In some embodiments, the winning number is already known to the system (e.g. via a sensor in the wheel). In other embodiments, placement of the instrumented dolly 1310 in one of the 36 numbered areas in the 3×12 grid defines the winning number. In other embodiments include both the sensor in the wheel and the detection of the instrumented dolly 1310 on the winning number, and the controller 1302 generates an alert if the results are inconsistent. Knowledge of the winning number determines which bets are winners and which bets are losers. The controller 1302 may then use the information regarding the bets placed (e.g. according to the RFID tags detected at the various betting spots) and the winning number (e.g. by detecting the RFID tag in the instrumented dolly 1310) to determine the proper payouts.

The instrumented dolly 1310 allows seamless integration with existing use cases while providing exact timestamps for key events, triggering changes in the game state, and determining payouts. These features enable a wide range of novel metrics including win/loss calculations, player betting patterns (e.g. by associating particular RFID tags with a particular player), dealer metrics (e.g. speed of play, number and type of errors, etc.), and logging outcomes to determine if a wheel is "true". These features also enable the controller 1302 to track various alarms, such as a late bet alarm or a winning bet change alarm. The late bet alarm occurs when the system is in the bets locked state and any bet occurs (e.g. a change in the RFID tags detected at a particular antenna). The winning bet change alarm occurs when once the instrumented dolly 1310 has been placed and winners and losers identified, the system enters the Payout state; the system detects any attempts to alter the bets placed on a winning spot and generates the alert.

In summary, the RFID system 1300 uses the RFID tag identifier of the instrumented dolly 1310, which is read when the instrumented dolly 1310 is placed on various locations on the roulette table, in order to change the game state of the roulette game. This operation of the RFID system 1300 differs from other uses of RFID tag identifiers (e.g. to determine the values of bets on a betting spot, to determine alerts, etc.) because these other uses are not used to change the game state. This operation of the RFID system 1300 also differs from other systems that change a game state because those systems use something other than a specific RFID tag identifier to change their game state.

5. Additional Applications

The features described above enable a number of additional applications, including a payout calculator and player win/loss correlation.

5.1. Payout Calculator

As noted above, roulette supports multiple bet types, each with its own odds. Furthermore, players can win and lose simultaneously (e.g. by placing bets on two numbers, only one of which is the winning number). And other players can make similar bets, with each bet distinguished by the unique color of each player's chips. Thus, there is a need to improve the accuracy and speed of payouts to winning bets.

The RFID system 1300 may track each bet using the antennas 1308 and the RFID reader 1304, determine the winning number using the instrumented dolly 1310, and managing the game states using the controller 1302, and the controller 1302 may use this information in combination with the payout odds to calculate the proper payout for each bet. The controller 1302 may display a payout calculator that shows the game state, the player chip colors and values, and for each player, the number of chips to be paid out for winning bets, and the total value of the winning bets. This information helps to reduce errors and to speed up the game, both of which improve the casino's profitability.

5.2. Player Win/Loss Correlation

One goal of the embodiments described herein is to accurately reflect player loyalty with a well-defined metric based on actual facts. Buy ins and cash outs are a staple of roulette, when the player exchanges their value chips for color chips in order to place bets on the roulette table. Signing in a player using their loyalty card is an attempt to understand how long a player remains at a table as a proxy for their value as a customer, but time alone is a poor metric. Four additional pieces of information are beneficial to generate a proper player loyalty metric, including the color of their chips, the value they have assigned to their color chips, the size and type of their bets, and the player win/loss for each spin of the wheel.

Each of the systems described herein may bring together all five of these disparate data sets into a single player value metric that can result in more efficient use of comps or other loyalty benefits. Knowing which colors, the value, the bet type and volume, and whether a player won or lost provides a definitive value of a player to a casino in the form of "Player X1 is worth $24.57/hour when he is at a roulette table" or "Player X1 has an account balance of $4,300 since May 1".

Furthermore, by correlating player bets with wheel outcomes, the system can undertake long-term statistical analyses to determine whether the wheel is "true", and if not true, do a player's betting patterns correlate? If so, the system can generate an alert.

ENUMERATED EXAMPLE EMBODIMENTS

Various aspects of the present invention may be appreciated from the following enumerated example embodiments (EEEs).

EEE B1. A system for determining locations of objects in a gaming environment, the system comprising: a plurality of radio-frequency identification (RFID) antennas arranged at a plurality of locations on a gaming table; a RFID reader coupled to the plurality of RFID antennas; a plurality of reactive tuning components that couple the plurality of RFID antennas to the RFID reader; and a controller, wherein the controller adjusts a reactance between the RFID reader and a selected antenna of the plurality of RFID antennas, wherein adjusting the reactance includes selectively connecting one or more of the plurality of reactive components, and wherein adjusting the reactance includes performing impedance matching between the RFID reader and the selected antenna.

EEE B2. The system of EEE B1, further comprising: a network analyzer system, wherein the network analyzer system measures a reflection coefficient of the selected antennas, and wherein the controller adjusts the reactance based on a result of measuring the reflection coefficient.

EEE B3. The system of EEE B2, wherein prior to each read operation performed by the RFID reader, the network analyzer system measures the reflection coefficient and the controller adjusts the reactance of the plurality of reactive tuning components.

EEE B4. The system of EEE B2, wherein the plurality of RFID antennas has a plurality of configurations, wherein each configuration includes one of a plurality of turns and one of a plurality of loop sizes, wherein the controller adjusts the reactance for each antenna of the plurality of RFID antennas by switching a subset of the plurality of tuning components, wherein the subset is selected according to the reflection coefficient measured for each antenna of the plurality of RFID antennas.

EEE B5. The system of EEE B1, wherein the RFID reader performs a first read operation on the selected antenna, wherein the controller adjusts the reactance based on a result of the first read operation, and wherein the RFID reader performs a second read operation on the selected antenna using the reactance having been adjusted.

EEE B6. The system of EEE B1, wherein the plurality of reactive tuning components includes a first set of components in a series configuration and a second set of components in a shunt configuration, wherein each component in a given set has a different reactance value from each other component in the given set, and wherein the controller adjusts the reactance by selecting one or more of the first set of components and one or more of the second set of components.

EEE B7. The system of EEE B1, plurality of reactive tuning components includes a plurality of pre-configured reactance configurations, wherein the selected antenna is associated with a subset of the plurality of pre-configured reactance configurations, and wherein the controller adjusts the reactance by selecting one of the subset of the plurality of pre-configured reactance configurations.

EEE B8. The system of EEE B1, wherein the RFID reader successively performs a plurality of RFID read operations, wherein the controller dynamically adjusts the reactance as the RFID reader successively performs the plurality of RFID read operations.

EEE B9. A method of determining locations of objects in a gaming environment, the method comprising: providing a plurality of radio-frequency identification (RFID) antennas arranged at a plurality of locations on a gaming table; providing a RFID reader coupled to the plurality of RFID antennas; providing a plurality of reactive tuning components that couple the plurality of RFID antennas to the RFID reader; and adjusting a reactance between the RFID reader and a selected antenna of the plurality of RFID antennas, wherein adjusting the reactance includes selectively connecting one or more of the plurality of reactive components, and wherein adjusting the reactance includes performing impedance matching between the RFID reader and the selected antenna.

EEE C1. A system for determining locations of objects in a gaming environment, the system comprising: a plurality of radio-frequency identification (RFID) antennas arranged at a plurality of locations on a gaming table; a network analyzer system; an RFID reader; a switchable reactance network that selectively connects the plurality of RFID antennas with one of the network analyzer system and the RFID reader using a selectable reactance, wherein the switchable reactance network includes a plurality of switches and a shunt element, wherein the shunt element is located inboard of at least two of the plurality of switches; and a controller, wherein the controller controls the network analyzer system to measure a reflection coefficient of a selected antenna of the plurality of RFID antennas, and wherein based on the reflection coefficient having been measured, the controller controls the RFID reader to energize the selected antenna, wherein in response to energizing the selected antenna, the RFID reader receives at least one RFID tag identifier from at least one RFID tag near the selected antenna.

EEE C2. The system of EEE C1, wherein the plurality of RFID antennas includes two or more antennas arranged to cover a given area of the gaming table, wherein the controller selectively couples the network analyzer system to each of the two or more antennas to measure a reflection coefficient of each of the two or more antennas, wherein selectively coupling includes selectively connecting each one of the two or more antennas and selectively disconnecting, via an open loop, all other of the two or more antennas besides the one antenna that has been selectively connected, and wherein the controller controls the RFID reader to selectively energize the two or more antennas based on a result of measuring the reflection coefficient of each of the two or more antennas.

EEE C3. The system of EEE C1, wherein the controller controls the switchable reactance network to connect one of the network analyzer system and the RFID reader to the selected antenna using the plurality of switches.

EEE C4. The system of EEE C1, wherein the controller controls the switchable reactance network to adjust the selectable reactance based on the reflection coefficient having been measured.

EEE C5. A method of determining locations of objects in a gaming environment, the method comprising: providing a plurality of radio-frequency identification (RFID) antennas arranged at a plurality of locations on a gaming table; providing a network analyzer system; providing an RFID reader; providing a switchable reactance network that selectively connects the plurality of RFID antennas with one of the network analyzer system and the RFID reader using a selectable reactance, wherein the switchable reactance network includes a plurality of switches and a shunt element, wherein the shunt element is located inboard of at least two of the plurality of switches; controlling the network analyzer system to measure a reflection coefficient of a selected antenna of the plurality of RFID antennas; and based on the reflection coefficient having been measured, controlling the RFID reader to energize the selected antenna, wherein in response to energizing the selected antenna, the RFID reader receives at least one RFID tag identifier from at least one RFID tag near the selected antenna.

EEE D1. A system for determining locations of objects in a gaming environment, the system comprising: a plurality of radio-frequency identification (RFID) antennas arranged at a plurality of locations on a gaming table; a RFID reader coupled to the plurality of RFID antennas; an instrumented dolly having an RFID tag; and a controller, wherein the controller manages a plurality of game states related to the gaming table, wherein the RFID reader reads the instrumented dolly based on a proximity of the instrumented dolly to a subset of the plurality of RFID antennas on the gaming table, wherein the subset is less than all of the plurality of RFID antennas, and wherein the controller changes from one of the plurality of game states to another of the plurality of game states based on a result of the RFID reader reading the instrumented dolly.

EEE D2. The system of EEE D1, wherein the plurality of game states includes an Open Betting state, a Play state, and a Payout state.

EEE D3. The system of EEE D1, wherein the result of the RFID reader reading the instrumented dolly corresponds to one of a plurality of events, wherein the plurality of events includes a bets locked event, a winning number event, and a new game event.

EEE D4. The system of EEE D1, wherein the RFID reader reads a plurality of RFID tags nearby the plurality of RFID antennas, and wherein the controller generates an alert based on a current game state of the plurality of game states and a change in the plurality of RFID tags.

EEE D5. The system of EEE D1, wherein the gaming table includes an instrumented wheel that determines a winning number, wherein the controller determines a winning number by detecting the instrumented dolly by a particular antenna of the plurality of RFID antennas, and wherein the controller generates an alert when the winning number determined by detecting the instrumented dolly differs from the winning number determined by the instrumented wheel.

EEE D6. A method of determining locations of objects in a gaming environment, the method comprising: providing a plurality of radio-frequency identification (RFID) antennas arranged at a plurality of locations on a gaming table; providing a RFID reader coupled to the plurality of RFID antennas; providing an instrumented dolly having an RFID tag; managing, by a controller, a plurality of game states related to the gaming table; reading, by the RFID reader, the instrumented dolly based on a proximity of the instrumented dolly to a subset of the plurality of RFID antennas on the gaming table, wherein the subset is less than all of the plurality of RFID antennas; changes, by the controller, from one of the plurality of game states to another of the plurality of game states based on a result of the RFID reader reading the instrumented dolly.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A system for determining locations of objects in a gaming environment, the system comprising:

a plurality of radio-frequency identification (RFID) antennas arranged at a plurality of locations on a gaming table;

an RFID reader coupled to the plurality of RFID antennas;

an instrumented dolly having an RFID tag; and a controller, wherein the controller manages a plurality of game states related to the gaming table, wherein the RFID reader reads the instrumented dolly based on a proximity of the instrumented dolly to a subset of the plurality of RFID antennas on the gaming table, wherein the subset is less than all of the plurality of RFID antennas, and wherein the controller changes from one of the plurality of game states to another of the plurality of game states based on a result of the RFID reader reading the instrumented dolly.

2. The system of claim 1, wherein the plurality of game states includes an Open Betting state, a Play state, and a Payout state.

3. The system of claim 1, wherein the result of the RFID reader reading the instrumented dolly corresponds to one of a plurality of events, wherein the plurality of events includes a bets locked event, a winning number event, and a new game event.

4. The system of claim 1, wherein the RFID reader reads a plurality of RFID tags nearby the plurality of RFID antennas, and wherein the controller generates an alert based on a current game state of the plurality of game states and a change in the plurality of RFID tags.

5. The system of claim 1, wherein the controller stores a timestamp when the controller changes from one of the plurality of game states to another of the plurality of game states, wherein a plurality of timestamps including the timestamp forms a log of changing between the plurality of game states.

6. The system of claim 1, wherein the controller determines a winning number by detecting the instrumented dolly nearby a particular antenna of the plurality of RFID antennas.

7. The system of claim 6, wherein the controller stores the winning number in a log, wherein the log includes a plurality of winning numbers stored by the controller.

8. The system of claim 1, wherein the gaming table includes an instrumented wheel that determines a winning number, wherein the controller determines a winning number by detecting the instrumented dolly nearby a particular antenna of the plurality of RFID antennas, and wherein the controller generates an alert when the winning number determined by detecting the instrumented dolly differs from the winning number determined by the instrumented wheel.

9. A method of determining locations of objects in a gaming environment, the method comprising:

providing a plurality of radio-frequency identification (RFID) antennas arranged at a plurality of locations on a gaming table;

providing an RFID reader coupled to the plurality of RFID antennas;

providing an instrumented dolly having an RFID tag;

managing, by a controller, a plurality of game states related to the gaming table;

reading, by the RFID reader, the instrumented dolly based on a proximity of the instrumented dolly to a subset of the plurality of RFID antennas on the gaming table, wherein the subset is less than all of the plurality of RFID antennas; and changing, by the controller, from one of the plurality of game states to another of the plurality of game states based on a result of the RFID reader reading the instrumented dolly.

10. The method of claim 9, wherein the result of the RFID reader reading the instrumented dolly corresponds to one of a plurality of events, wherein the plurality of events includes a bets locked event, a winning number event, and a new game event.

11. The method of claim 9, wherein the RFID reader reads a plurality of RFID tags nearby the plurality of RFID antennas, and wherein the controller generates an alert based on a current game state of the plurality of game states and a change in the plurality of RFID tags.

12. The method of claim 9, further comprising:

storing, by the controller, a timestamp when the controller changes from one of the plurality of game states to another of the plurality of game states, wherein a plurality of timestamps including the timestamp forms a log of changing between the plurality of game states.

13. The method of claim 9, further comprising:

determining, by the controller, a winning number by detecting the instrumented dolly nearby a particular antenna of the plurality of RFID antennas.

14. The method of claim 9, wherein the gaming table includes an instrumented wheel that determines a winning number, the method further comprising:

determining, by the controller, a winning number by detecting the instrumented dolly nearby a particular antenna of the plurality of RFID antennas; and generating, by the controller, an alert when the winning number determined by detecting the instrumented dolly differs from the winning number determined by the instrumented wheel.

15. A system for determining locations of objects in a gaming environment, the system comprising:

a gaming table;

a plurality of radio-frequency identification (RFID) antennas arranged at a plurality of locations on the gaming table;

an RFID reader coupled to the plurality of RFID antennas;

an instrumented dolly having an RFID tag; and a controller, wherein the controller manages a plurality of game states related to the gaming table, wherein the RFID reader reads the instrumented dolly based on a proximity of the instrumented dolly to a subset of the plurality of RFID antennas on the gaming table, wherein the subset is less than all of the plurality of RFID antennas, and wherein the controller changes from one of the plurality of game states to another of the plurality of game states based on a result of the RFID reader reading the instrumented dolly.

16. The system of claim 15, wherein the result of the RFID reader reading the instrumented dolly corresponds to one of a plurality of events, wherein the plurality of events includes a bets locked event, a winning number event, and a new game event.

17. The system of claim 15, wherein the RFID reader reads a plurality of RFID tags nearby the plurality of RFID antennas, and wherein the controller generates an alert based on a current game state of the plurality of game states and a change in the plurality of RFID tags.

18. The system of claim 15, wherein the controller stores a timestamp when the controller changes from one of the plurality of game states to another of the plurality of game states, wherein a plurality of timestamps including the timestamp forms a log of changing between the plurality of game states.

19. The system of claim 15, wherein the controller determines a winning number by detecting the instrumented dolly nearby a particular antenna of the plurality of RFID antennas.

20. The system of claim 15, wherein the gaming table includes an instrumented wheel that determines a winning number, wherein the controller determines a winning number by detecting the instrumented dolly nearby a particular antenna of the plurality of RFID antennas, and wherein the controller generates an alert when the winning number determined by detecting the instrumented dolly differs from the winning number determined by the instrumented wheel.

* * * * *